United States Patent
Mo et al.

(10) Patent No.: US 11,018,895 B2
(45) Date of Patent: May 25, 2021

(54) METHOD AND SYSTEM FOR TRANSMITTING TRAIN NETWORK DATA BASED ON CANOPEN PROTOCOL, AND APPARATUS THEREOF

(71) Applicant: BYD COMPANY LIMITED, Shenzhen (CN)

(72) Inventors: Junsheng Mo, Shenzhen (CN); Wenxiao Zeng, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/625,934

(22) PCT Filed: Jun. 20, 2018

(86) PCT No.: PCT/CN2018/092050
§ 371 (c)(1),
(2) Date: Dec. 23, 2019

(87) PCT Pub. No.: WO2018/233645
PCT Pub. Date: Dec. 27, 2018

(65) Prior Publication Data
US 2020/0162283 A1    May 21, 2020

(30) Foreign Application Priority Data
Jun. 21, 2017  (CN) .......................... 201710477076.7

(51) Int. Cl.
*H04L 12/40*  (2006.01)
(52) U.S. Cl.
CPC .. *H04L 12/40182* (2013.01); *H04L 12/40202* (2013.01); *H04L 2012/40215* (2013.01); *H04L 2012/40293* (2013.01)

(58) Field of Classification Search
CPC ......... H04L 12/40182; H04L 12/40202; H04L 2012/40293; H04L 2012/40215
See application file for complete search history.

(56) References Cited

U.S. PATENT DOCUMENTS

| 6,907,485 | B2 * | 6/2005 | White, III | ............. H04L 12/403 340/1.1 |
| 7,206,882 | B2 * | 4/2007 | White, III | ......... H04L 12/40013 710/110 |

(Continued)

FOREIGN PATENT DOCUMENTS

| CN | 205596136 U | 9/2016 |
| CN | 106302064 A | 1/2017 |
| CN | 106452870 A | 2/2017 |

OTHER PUBLICATIONS

The World Intellectual Property Organization (WIPO) International Search Report for PCT/CN2018/092050 dated Sep. 10, 2018 5 Pages.

*Primary Examiner* — Rasheed Gidado
(74) *Attorney, Agent, or Firm* — Anova Law Group, PLLC

(57) ABSTRACT

The present disclosure discloses a CANopen-based train network data transmission method. The method includes: monitoring, on an active network, a heartbeat packet transmitted through a first CAN channel by each slave node related to an active master node; determining whether the first CAN channel of each slave node is faulty; transmitting a reset instruction to a first node from the active network if no heartbeat packet of the first node is received within the preset first heartbeat period; learning, if no heartbeat packet of the first node is received, that the first CAN channel of the first node is faulty, and switching to a standby network to monitor the heartbeat packet transmitted by the first node; otherwise, receiving, on the standby network, data transmit- (Continued)

ted by the first node, and also receiving, on the active network, data transmitted by other slave nodes that normally transmit heartbeat packets.

20 Claims, 14 Drawing Sheets

(56) References Cited

U.S. PATENT DOCUMENTS

| | | | |
|---|---|---|---|
| 9,628,288 B2* | 4/2017 | Han | H04L 47/25 |
| 2006/0088044 A1* | 4/2006 | Hammerl | H04L 61/2038 |
| | | | 370/402 |
| 2010/0082873 A1 | 4/2010 | Rosen et al. | |

* cited by examiner

METHOD AND SYSTEM FOR TRANSMITTING TRAIN NETWORK DATA BASED ON CANOPEN PROTOCOL, AND APPARATUS THEREOF

CROSS-REFERENCE TO RELATED APPLICATIONS

This application is a national phase entry under 35 U.S.C. § 371 of International Application No. PCT/CN2018/092050, filed on Jun. 20, 2018, which claims priority to Chinese Patent Application No. 201710477076.7, filed by BYD Company Limited on Jun. 21, 2017 and entitled "METHOD AND SYSTEM FOR TRANSMITTING TRAIN NETWORK DATA BASED ON CANOPEN PROTOCOL, AND APPARATUS THEREOF", content of all of which is incorporated herein by reference in its entirety.

FIELD

The present disclosure relates to the field of vehicle communications technologies and, in particular, to a CANopen-based train network data transmission method, and a system and an apparatus thereof.

BACKGROUND

Currently, one technology that is widely applied to a train communications network is a Train Communications Network (TCN) bus technology. A TCN covers four types of buses: multifunction vehicle bus (MVB), wire train bus (WTB), Ethernet bus, and controller area network (CAN) fieldbus. In the design requirements for the four types of buses MVB, WTB, Ethernet, and CAN, a common requirement is network redundancy design. Network redundancy means that each communications network has a standby network. To be specific, each node on the network is connected in a dual-line mode, that is, through a line A and a line B. When the network is faulty, communication can be implemented by using the standby network. This ensures smooth exchange of data of all products on the network and high availability of an operating environment of the communications network in a train.

Generally, if data exchange is performed by using a CAN bus in the design of a train communications network, the design is mostly based on CANopen (a high-level communications protocol based on a CAN bus, which is a fieldbus that is commonly used in industrial control currently). The CANopen is defined as a standardized application layer protocol that is designed based on a CAN bus. The CANopen protocol supports a complete network management mechanism for traditional CANs, so as to support network redundancy design.

SUMMARY

The present disclosure is directed to resolve one of the foregoing technical problems at least to some extent.

Therefore, a first objective of the present disclosure is to provide a CANopen-based train network data transmission method. In this method, when an active network of one or more slave nodes breaks down, services are switched to a standby network to receive data of such slave nodes, and data of other slave nodes is still received on the active network. This ensures complete receipt of data of related slave nodes and sound operation of an entire train, and improves redundancy effects of a train network.

A second objective of the present disclosure is to provide another CANopen-based train network data transmission method.

A third objective of the present disclosure is to provide an active master node.

A fourth objective of the present disclosure is to provide a slave node.

A fifth objective of the present disclosure is to provide a CANopen-based train network data transmission system.

To fulfill the foregoing objectives, an embodiment in a first aspect of the present disclosure provides a CANopen-based train network data transmission method, including: monitoring, based on a preset network node list and on an active network, a heartbeat packet transmitted through a first CAN channel by each slave node related to the active master node; determining, based on timing status of a heartbeat timer that is set corresponding to each slave node and based on receipt status of the heartbeat packet, whether a first CAN channel of each slave node is faulty; determining, if it is determined that no heartbeat packet of a first node is received within a preset first heartbeat period, that a first CAN channel of the first node is faulty, and switching to a standby network to monitor the heartbeat packet transmitted by the first node, wherein the first node is any slave node related to the active master node; and receiving, if a heartbeat packet transmitted by the first node through the second CAN channel is received within the preset heartbeat period, data on the standby network that is transmitted by the first node, and also receiving, on the active network, data transmitted by other slave nodes that normally transmit heartbeat packets.

According to the CANopen-based train network data transmission method provided in this embodiment of the present disclosure, the heartbeat packet transmitted through the first CAN channel by each slave node related to the active master node is monitored on the active network based on a preset network node list, and whether the first CAN channel of each slave node is faulty is determined based on the timing status of the heartbeat timer that is set corresponding to each slave node, and based on the receipt status of the heartbeat packet. In this way, if it is determined that no heartbeat packet of the first node is received within the preset first heartbeat period, then it is learned that the first CAN channel of the first node is faulty, and services are switched to the standby network to monitor the heartbeat packet transmitted by the first node through the second CAN channel. If a heartbeat packet transmitted by the first node through the second CAN channel is received within the preset first heartbeat period, the data transmitted by the first node needs to be received on the standby network, and at the same time, the data transmitted by other slave nodes other than the first node needs to be received on the active network. Therefore, when the active network of one or more slave nodes breaks down, services are switched to the standby network to receive the data of such slave nodes, and the data of other slave nodes is still received on the active network. This ensures complete receipt of the data of the related slave nodes and sound operation of the entire train, and improves redundancy effects of the train network.

To fulfill the foregoing objectives, an embodiment in a second aspect of the present disclosure provides another CANopen-based train network data transmission method, including: monitoring, based on a preset network node list and on an active network, a heartbeat packet transmitted through a first CAN channel by each slave node related to the slave node; determining, based on timing status of a heartbeat timer that is set corresponding to each slave node and based on receipt status of the heartbeat packet, whether a first CAN channel of each slave node is faulty; determining, if it is determined that no heartbeat packet of a second node is received within a preset first heartbeat period, that a first CAN channel of the second node is faulty, and switching to a standby network to monitor the heartbeat packet transmitted by the second node, wherein the second node is any slave node related to the slave node or is an active master node; and receiving, if a heartbeat packet transmitted by the second node through a second CAN channel is received within the preset heartbeat period, data on the standby network that is transmitted by the second node, and also receiving, on the active network, data transmitted by other slave nodes other than the second node.

According to the CANopen-based train network data transmission method provided in this embodiment of the present disclosure, the heartbeat packet transmitted through the first CAN channel by each node related to the slave node is monitored on the active network based on a preset network node list, and whether the first CAN channel of each slave node is faulty is determined based on the timing status of the heartbeat timer that is set corresponding to each slave node, and based on the receipt status of the heartbeat packet. If it is determined that no heartbeat packet of the second node is received within the preset heartbeat period, then it is learned that the first CAN channel of the second node is faulty, and services are switched to the standby network to monitor the heartbeat packet transmitted by the second node through the second CAN channel is received within the preset heartbeat period, the data transmitted by the second node needs to be received on the standby network, and at the same time, the data transmitted by other slave nodes other than the second node needs to be received on the active network. Therefore, when the active network of one or more slave nodes breaks down, services are switched to the standby network to receive the data of such slave nodes, and the data of other slave nodes is still received on the active network. This ensures complete receipt of the data of the related slave nodes and sound operation of the entire train, and improves redundancy effects of the train network.

To fulfill the foregoing objectives, an embodiment in a third aspect of the present disclosure provides an active master node, including: a first monitoring module, configured to monitor, on an active network and based on a preset network node list, a heartbeat packet transmitted through a first CAN channel by each slave node related to the active master node; a first determining module, configured to determine, based on timing status of a heartbeat timer that is set corresponding to each slave node and based on receipt status of the heartbeat packet, whether a first CAN channel of each slave node is faulty; a first processing module, configured to learn, if it is determined that no heartbeat packet of a first node is received within a preset first heartbeat period, that a first CAN channel of the first node is faulty, and control the first monitoring module to switch to a standby network to monitor the heartbeat packet transmitted by the first node, where the first node is any slave node related to the active master node; and a first receiving module, configured to receive, when a heartbeat packet transmitted by the first node through a second CAN channel is received within the preset first heartbeat period, data on the standby network that is transmitted by the first node, and also receive, on the active network, data transmitted by other slave nodes that normally transmit heartbeat packets.

The active master node provided in this embodiment of the present disclosure monitors, on the active network and based on a preset network node list, the heartbeat packet transmitted through the first CAN channel by each slave node related to the active master node, and determines whether the first CAN channel of each slave node is faulty based on the timing status of the heartbeat timer that is set corresponding to each slave node, and based on the receipt status of the heartbeat packet. In this way, if it is determined that no heartbeat packet of the first node is received within the preset first heartbeat period, then it is learned that the first CAN channel of the first node is faulty, and services are switched to the standby network to monitor the heartbeat packet transmitted by the first node through the second CAN channel. If a heartbeat packet transmitted by the first node through the second CAN channel is received within the preset first heartbeat period, the data transmitted by the first node needs to be received on the standby network, and at the same time, the data transmitted by other slave nodes other than the first node needs to be received on the active network. Therefore, when the active network of one or more slave nodes breaks down, services are switched to the standby network to receive the data of such slave nodes, and the data of other slave nodes is still received on the active network. This ensures complete receipt of the data of the related slave nodes and sound operation of the entire train, and improves redundancy effects of the train network.

To fulfill the foregoing objectives, an embodiment in a fourth aspect of the present disclosure provides a slave node, including: a second monitoring module, configured to monitor, on an active network and based on a preset network node list, a heartbeat packet transmitted through a first CAN channel by each node related to the slave node; a second determining module, configured to determine, based on timing status of a heartbeat timer that is set corresponding to each slave node and based on receipt status of the heartbeat packet, whether a first CAN channel of each slave node is faulty; a second processing module, configured to learn, if it is determined that no heartbeat packet of a second node is received within a preset heartbeat period, that a first CAN channel of the second node is faulty, and control the second monitoring module to switch to a standby network to monitor the heartbeat packet transmitted by the second node, where the second node is any slave node related to the slave node or is an active master node; and a second receiving module, configured to receive, when a heartbeat packet transmitted by the second node through a second CAN channel is received within the preset heartbeat period, data on the standby network that is transmitted by the second node, and also receive, on the active network, data transmitted by other nodes that normally transmit heartbeat packets.

The slave node provided in this embodiment of the present disclosure monitors, on the active network and based on a preset network node list, the heartbeat packet transmitted through the first CAN channel by each slave node related to the slave node, and determines whether the first CAN channel of each slave node is faulty based on the timing status of the heartbeat timer that is set corresponding to each slave node, and based on the receipt status of the heartbeat packet. If it is determined that no heartbeat packet of the second node is received within the preset heartbeat period, then it is learned that the first CAN channel of the second node is faulty, and services are switched to the standby network to monitor the heartbeat packet transmitted by the second node through the second CAN channel. If a heartbeat packet transmitted by the second node through the second CAN channel is received within the preset heartbeat period, the data transmitted by the second node needs to be received on the standby network, and at the same time, the data transmitted by other slave nodes other than the second node needs to be received on the active network. Therefore, when the active network of one or more slave nodes breaks down, services are switched to the standby network to receive the data of such slave nodes, and the data of other slave nodes is still received on the active network. This ensures complete receipt of the data of the related slave nodes and sound operation of the entire train, and improves redundancy effects of the train network.

To fulfill the foregoing objectives, an embodiment in a fifth aspect of the present disclosure provides a CANopen-based train network data transmission system, including the active master node according to the embodiment in the third aspect of the present disclosure, the slave node according to the embodiment in the fourth aspect of the present disclosure, an active network, and a standby network.

The CANopen-based train network data transmission system provided in this embodiment of the present disclosure resolves the problem in the prior art that the data of some nodes fails to be received normally when different channels of multiple nodes are faulty, effectively avoids discard of some node data when active networks of some nodes have a channel fault and standby networks of some other nodes have a channel fault, enhances practical effects of redundancy design, properly avoids disrupted operation of an entire train caused by a network fault of the train, and ensures that all nodes on a network can still communicate normally in some abnormal circumstances.

To fulfill the foregoing objectives, an embodiment in a sixth aspect of the present disclosure provides a computer device, including a memory, a processor, and a computer program that is stored in the memory and executable in the processor. When executing the computer program, the processor implements the CANopen-based train network data transmission method according to the embodiment in the first aspect of the present disclosure.

To fulfill the foregoing objectives, an embodiment in a seventh aspect of the present disclosure provides a computer device, including a memory, a processor, and a computer program that is stored in the memory and executable in the processor. When executing the computer program, the processor implements the CANopen-based train network data transmission method according to the embodiment in the second aspect of the present disclosure.

To fulfill the foregoing objectives, an embodiment in an eighth aspect of the present disclosure provides a storage medium for storing an application. The application is configured to execute the CANopen-based train network data transmission method according to the embodiment in the first aspect of the present disclosure.

To fulfill the foregoing objectives, an embodiment in a ninth aspect of the present disclosure provides a storage medium for storing an application. The application is configured to execute the CANopen-based train network data transmission method according to the embodiment in the second aspect of the present disclosure.

Other aspects and advantages of the present disclosure will be given in the following description, some of which will become apparent from the following description or may be learned from practices of the present disclosure.

BRIEF DESCRIPTION OF THE DRAWINGS

The foregoing and/or additional aspects and advantages of the present disclosure will become apparent and comprehensible in the description made with reference to the following accompanying drawings, where.

DETAILED DESCRIPTION

The following describes embodiments of the present disclosure in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain the present disclosure and cannot be construed as a limitation to the present disclosure.

A CANopen-based train network data transmission method, and a system and an apparatus thereof according to embodiments of the present disclosure are described below with reference to the accompanying drawings.

Specifically, from a redundancy network design manner in the prior art, it can be seen that, few trains currently use a CAN bus for the purpose of a communications network, and a network architecture built with a CAN bus is relatively simple, and even no network redundancy design is properly considered for a train to which a CAN bus has been applied so far. Even if redundancy is considered, many train manufacturers have limited technical conditions and expect that software logic processing of network nodes is so simple that a network can be constructed quickly. Therefore, a relatively sound strategy currently available is that each node transmits data on both an active network and a standby network simultaneously, but the data is received on only one of the networks. No matter which node on the active network has broken down, all nodes related to the down node are switched to the standby network to receive and process the data of the down node and data of other related nodes.

Figure 1:
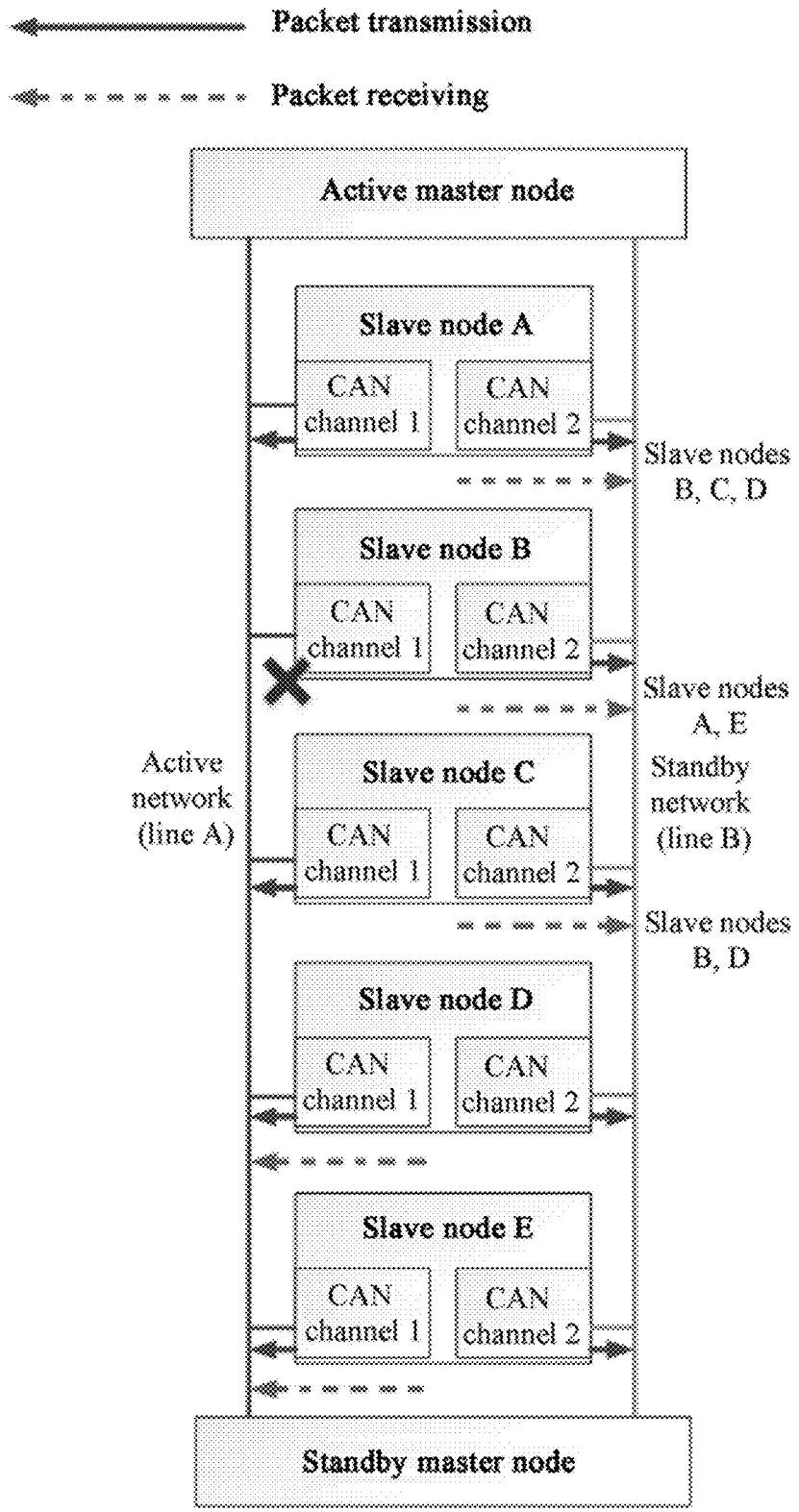
FIG. 1 is a schematic structural diagram of a train network.

For example, as shown in FIG. 1, a slave node A receives data of slave nodes B, C, and D, the slave node B receives data of A and E, the slave node C receives data of B and D, the slave nodes A and C need to receive data of the slave node B, but neither slave node D nor E receives data of the slave node B. When a first CAN channel of the slave node B is faulty, the slave node A and the slave node C switch to the standby network to receive data, thereby ensuring normal receipt of the data of the slave node B.

Figure 2A:
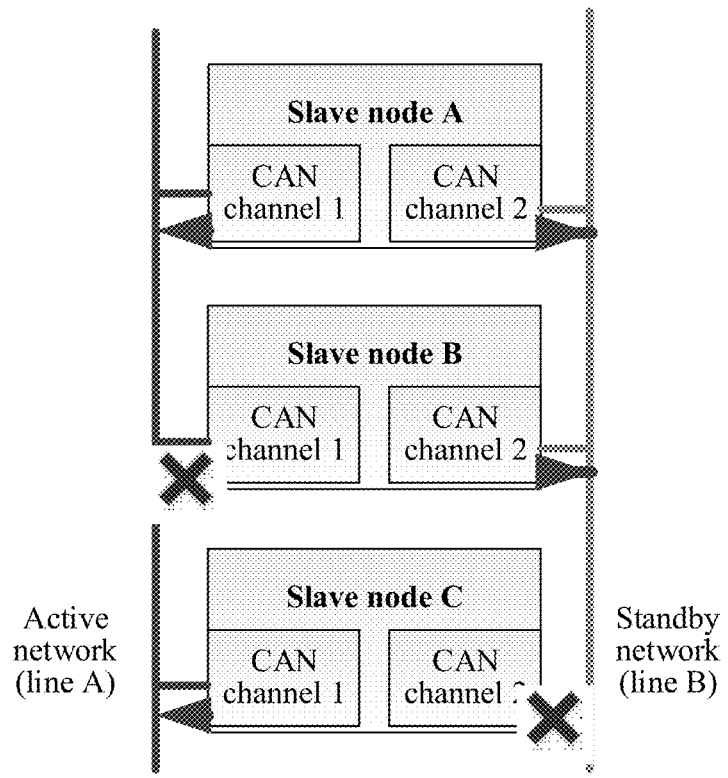
FIG. 2A is a schematic diagram of data transmission risks of a train network structure.

However, there is a risk in such a processing manner. As shown in the example given in FIG. 2A, the slave node A needs to receive data from the slave node B and the slave node C, but when a first CAN channel of the slave node B is faulty and a second CAN channel of the slave node C is faulty, the existing processing manner requires that the node A can receive data from only one of them. Therefore, the node A has to discard the data of the slave node B or the slave node C. However, in fact, both the data of the slave node B and the data of the slave node C are very important to the slave node A. Receipt of only one of them will affect functions of the slave node A, and further affect operation of an entire train, thereby reducing redundancy effects drastically and failing to fulfill tenets of redundancy.

To resolve the technical problem in the prior art that data of some nodes cannot be normally received when different channels of multiple nodes are faulty, a train network data transmission method provided in the present disclosure provides a network redundancy data transmission solution for a train on the basis of an existing redundancy design structure for train networks. This solution can effectively avoid discard of some node data when active networks of some nodes have a channel fault and standby networks of some other nodes have a channel fault, enhances practical effects of redundancy design, properly avoids disrupted operation of an entire train caused by a network fault of the train, and ensures that all nodes on a network can still communicate normally in some abnormal circumstances.

It should be emphasized that the train network data transmission method in the present disclosure is performed based on a CANopen protocol. The CANopen protocol requires that one node in the network should act as an active master node to manage initialization, startup, supervision, resetting, shutdown or other operations of other slave nodes.

To better clarify the CANopen-based train network data transmission method in the present disclosure, the following describes, with reference to specific embodiments, the method applied to an active master node side. The method is described as follows:

To better perform the CANopen-based train network data transmission method in this embodiment of the present disclosure, some design requirements are imposed on the active master node. As a network administrator, the active master node has a network status control function that is not available from a slave node. To be specific, after being powered on, the active master node needs to transmit a network control instruction to both the active network and the standby network at the same time, so that two CAN channels of the slave node are controlled to enter an operation mode. At the same time, the active master node transmits a synchronization packet, a timestamp, an emergency object packet and other packets to both the active network and the standby network.

Figure 3:
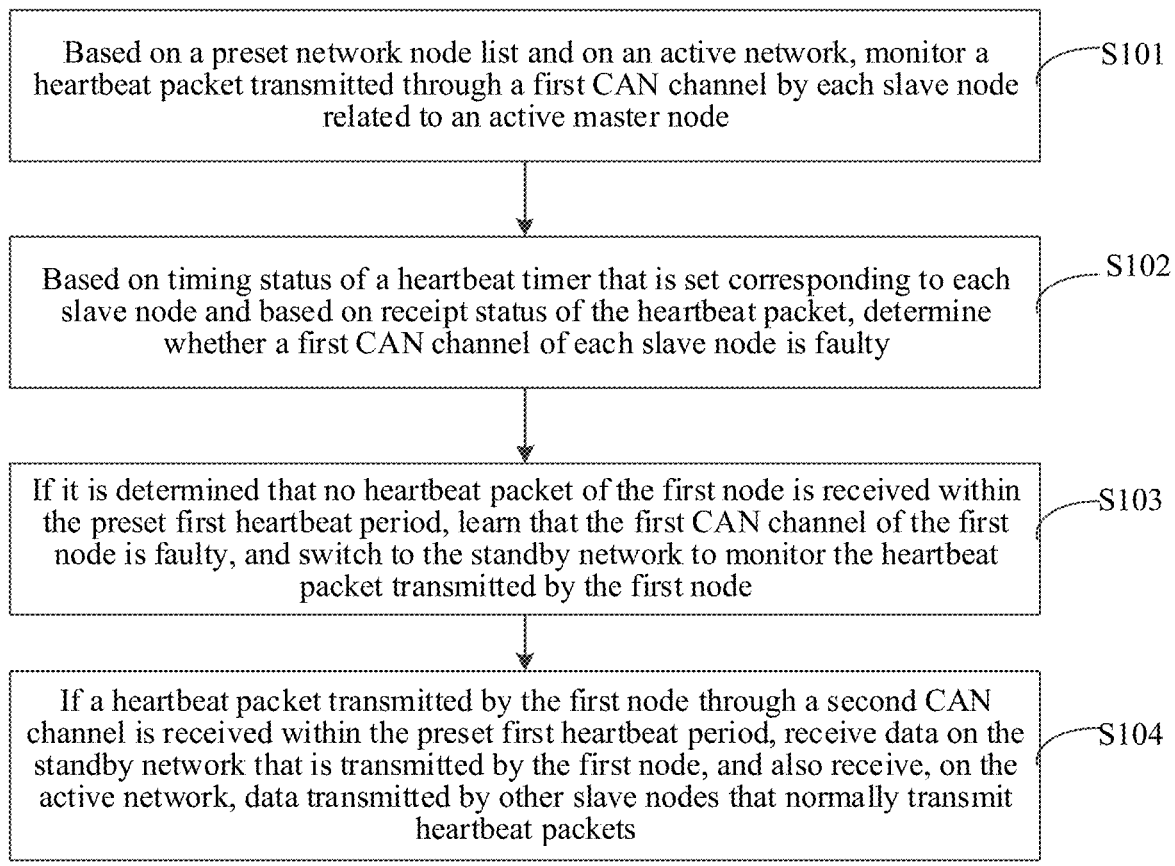
FIG. 3 is a flowchart of a CANopen-based train network data transmission method according to an embodiment of the present disclosure.

FIG. 3 is a flowchart of a CANopen-based train network data transmission method according to a first embodiment of the present disclosure. As shown in FIG. 3, the method includes the following steps.

S101. Monitor, based on a preset network node list and on an active network, a heartbeat packet transmitted through a first CAN channel by each slave node related to an active master node.

Understandably, a network node list corresponding to the active master node is preset based on a network topology view. The network node list includes identifiers of slave nodes related to the active master node and heartbeat timers corresponding to the slave nodes, where the identifier of a slave node may be information that uniquely identifies the slave node, such as an identity (ID) of the slave node.

In addition, a network control instruction is transmitted from an active network and a standby network to all slave nodes, a first CAN channel and a second CAN channel of the slave nodes are controlled to get into a heartbeat packet operation mode, and a heartbeat timer corresponding to each slave node related to the active master node is started.

Specifically, after going live (that is, the active master node works normally and is in operation with all functions enabled), the active master node performs a heartbeat packet-based monitoring mechanism. Based on a network topology view, the active master node may create a (configurable) list of all network nodes, that is, an object index in a custom CANopen object dictionary, where each node is identified by a unique node ID of the node. The object index is an object storage space that includes node identifiers (such as node IDs) of all nodes. The active master node sets a heartbeat timer for each node. After the active master node goes live, each heartbeat timer counts down. The active master node parses a received heartbeat packet to obtain a corresponding node identifier such as node ID, and then matches the node ID with a node list in its own object dictionary, and resets the heartbeat timer corresponding to each matched node and starts over timing. According to this characteristic requirement, all nodes including the active master node periodically transmit heartbeat packets at specific intervals in the name of their respective node IDs on the active network and the standby network at the same time.

In a practical application, in a default state, the active master node monitors heartbeat packet transmission status of each slave node on the active network first. To be specific, based on a preset network node list, the active master node monitors, on the active network, a heartbeat packet transmitted through a first CAN channel by each slave node related to the active master node.

S102. Determine, based on timing status of a heartbeat timer that is set corresponding to each slave node and based on receipt status of the heartbeat packet, whether a first CAN channel of each slave node is faulty.

Specifically, if the first CAN channel of the slave node is in proper communication, the active master node can normally receive the heartbeat packet from the slave node within a specified time. Otherwise, the first CAN channel of the slave node is in faulty communication.

Certainly, in some circumstances, the active master node may fail in normally receiving the heartbeat packet from the slave node due to some other reasons. For example, network signals are subjected to abrupt interference. Therefore, in order to avoid misjudgment and accurately determine whether the first CAN channels of the slave nodes are faulty, the timing status of the heartbeat timers that are set corresponding to the slave nodes and the receipt status of the heartbeat packets are taken into overall consideration, to determine whether the first CAN channels of the slave nodes are faulty.

For example, when no heartbeat packet of a node is detected in three heartbeat periods, the active master node first resets the node by using a reset instruction controlled by the network, and then keeps monitoring in two heartbeat periods. If the heartbeat packet of the node is received in the two heartbeat periods, the active master node keeps processing of this node on the active network. Otherwise, it is determined that the first CAN channel of the slave node may be faulty.

Further, the timing status of the heartbeat timer in the foregoing example is merely exemplary. Depending on different application requirements, whether the first CAN channels of the slave nodes are faulty may also be determined according to a combination of other heartbeat periods. For example, when no heartbeat packet of a slave node is detected in five heartbeat periods, it is directly determined that a first CAN channel of the slave node is faulty.

S103. Learn, if it is determined that no heartbeat packet of the first node is received within the preset first heartbeat period, that the first CAN channel of the first node is faulty, and switch to the standby network to monitor the heartbeat packet transmitted by the first node.

The heartbeat packet transmitted by the first node and monitored on the standby network is transmitted by the first node through a second CAN channel, where the first node is any slave node related to the active master node.

Specifically, if no heartbeat packet of the first node is received in the preset first heartbeat period, it indicates that the failure by the active master node of receiving the heartbeat packet transmitted by the first node is caused by the fault of the first CAN channel. Therefore, to ensure the active master node to normally receive the data of the first node and maintain normal operation of an entire train, the active master node switches to the standby network to monitor the heartbeat packet transmitted by the first node through the second CAN channel.

Figure 2B:
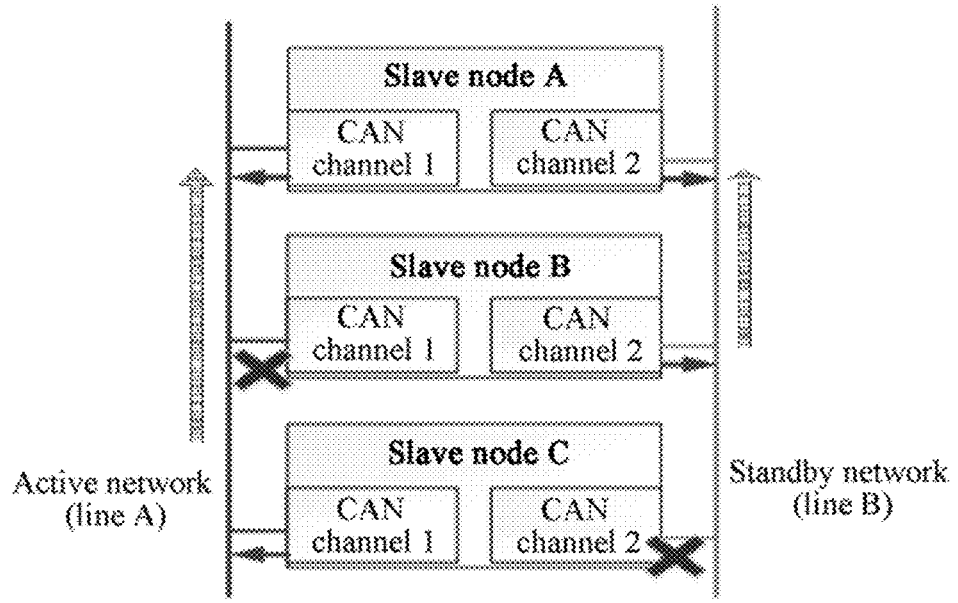
FIG. 2B is a schematic diagram of overcoming data transmission risks of a train network structure according to the present disclosure.

Further, in this case, the active master node monitors the heartbeat packet of the first node on only the standby network, but still receives the heartbeat packet on the active network from other nodes whose first CAN channels are not faulty. Therefore, as shown in FIG. 2B, a node A needs to receive data from a node B and a node C. When the first CAN channel of the node B is faulty and the second CAN channel of the node C is faulty, according to the data transmission method of the present disclosure, the node A receives data from the node C over the active network, and receives data from the node B from the standby network. In this way, with the data being able to be received from both the node B and the node C, normal functions of the node A are ensured, sound operation of the entire train is ensured, and redundancy effects are enhanced.

In another embodiment of the present disclosure, if the heartbeat packet of the first node is received within a preset period, it indicates that a data transmission fault of the node can be self-cured by resetting, and the data transmitted by the first node continues to be received from the active network.

S104. If a heartbeat packet transmitted by the first node through a second CAN channel is received within the preset first heartbeat period, receive data on the standby network that is transmitted by the first node, and also receive, on the active network, data transmitted by other slave nodes that normally transmit heartbeat packets.

Specifically, if the heartbeat packet transmitted by the first node through the second CAN channel is received within the preset first heartbeat period, it indicates that the second CAN channel functions normally. Therefore, the data transmitted by the first node needs to be received on the standby network.

Figure 4:
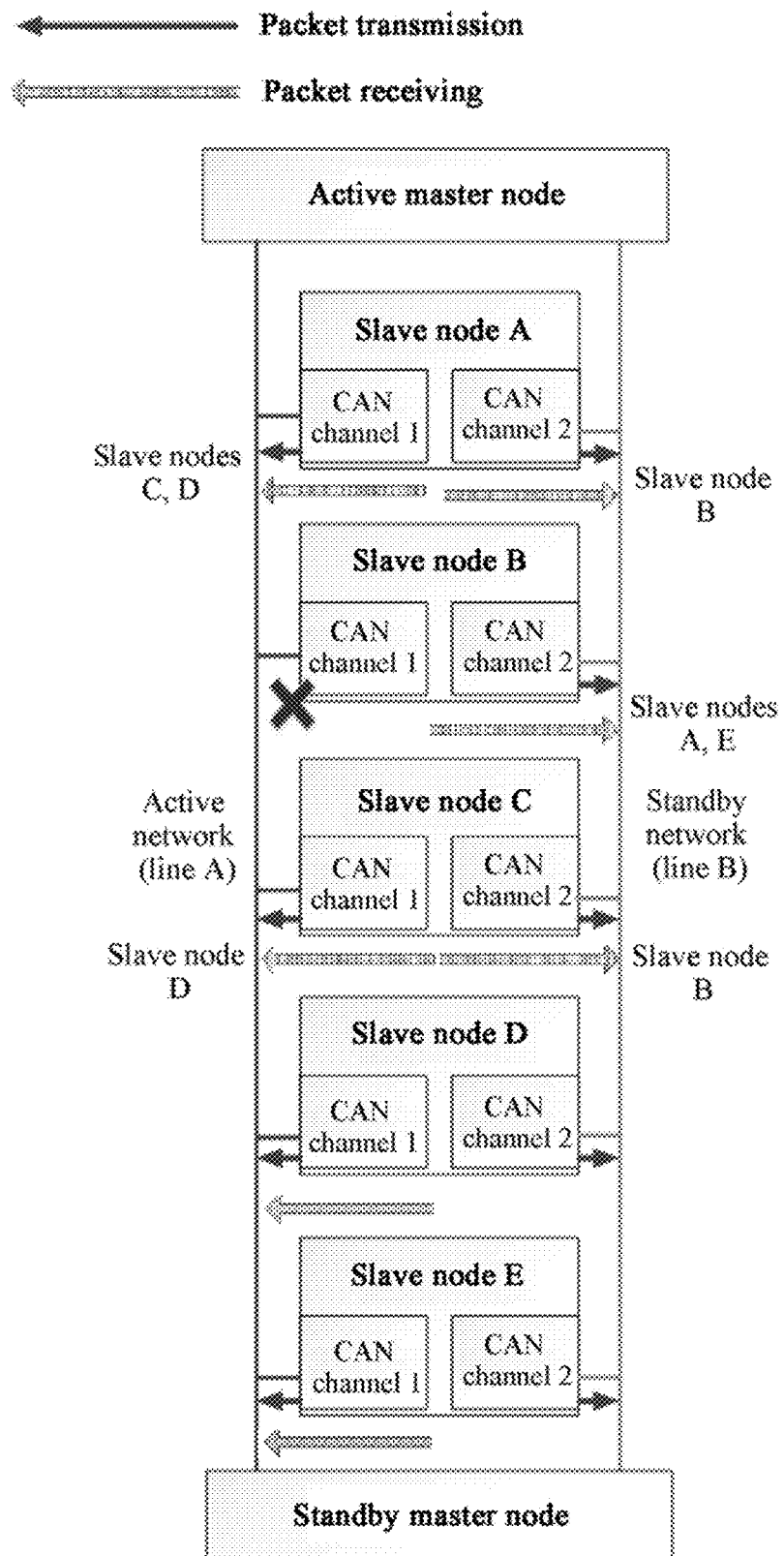
FIG. 4 is an exemplary topology view of a data transmission method of a redundant train network according to an embodiment of the present disclosure.

Therefore, according to the foregoing description of the CANopen-based train network data transmission method, with reference to the CAN redundancy design specified in the industrial specifications CIA302-6 and a mature fieldbus redundancy mechanism applied to the railway industry, a network architecture of the embodiment of the present disclosure should be established with reference to FIG. 4. In FIG. 4, the slave node A receives the data of the slave nodes B and C, the slave node B receives the data of the slave nodes A and E, and the slave node C receives the data of the slave nodes B and D. Two master nodes are set up in a network, one is an active master node, and the other is a standby master node. When the active master node is faulty, the standby master node works instead to undertake functions of the previous active master node.

In addition, the nodes on all networks are connected by two CAN bus pairs: a line A and a line B. The line A is defined as an active network, and the line B is defined as a standby network. All nodes in operation transmit information to the line A and the line B at the same time, but by default, receive information on only the line A. However, the nodes must be enabled to receive information on both the line A and the line B. In this way, when the first CAN channel of a slave node is faulty, data of this node will be received from the standby network, and the data transmitted by other slave nodes whose first CAN channels are not faulty will still be received from the active network. This ensures complete receipt of the data of the related slave nodes and sound operation.

In the foregoing description of the embodiments of the present disclosure, it is assumed that the active network and the standby network have no communication fault. In a practical application, however, the active network and the standby network may be faulty. Therefore, after going live, the active master node also implements a bus fault determining mechanism.

Specifically, according to characteristic requirements of a CAN bus, all CAN controllers must include a transmission error counter and a receipt error counter. With reference to an error detection mechanism defined on a data link layer, when a bus communication abnormity is detected, the error counter will start counting. When the count of the error counter adds up to 255, the node gets into a bus-off state.

It is now required that the active master node should simultaneously monitor bus status of the active network and the standby network. When a bus of the active network of the active master node is faulty (for example, voltage of a CAN bus is abnormal, bus-off caused by too many frame errors, etc.), the active master node first parses the heartbeat packet of the standby master node to decide whether to start the standby master node. If the standby master node can normally function as an active master node, the active master node stops operating and gets into a silent state, and the standby active node starts to act as an active master node. If the standby master node is currently in a fault state and incompetent to act as an active master node, the current active master node keeps operating and immediately switches to the standby network to process all slave node data. Meanwhile, the active master node informs an instrument or another device that the active network is currently in a fault state. If the current standby network is also faulty, the communications network breaks down, and all nodes get into a special operation state of the train.

The count to 255 of the error counter is merely an example. Depending on different application requirements, when the count of the transmission error counter or the receipt error counter of the active master node adds up to any preset value that meets requirements, it is learned that the active network is faulty, and services are switched to the standby network to communicate with other nodes.

Figure 5:
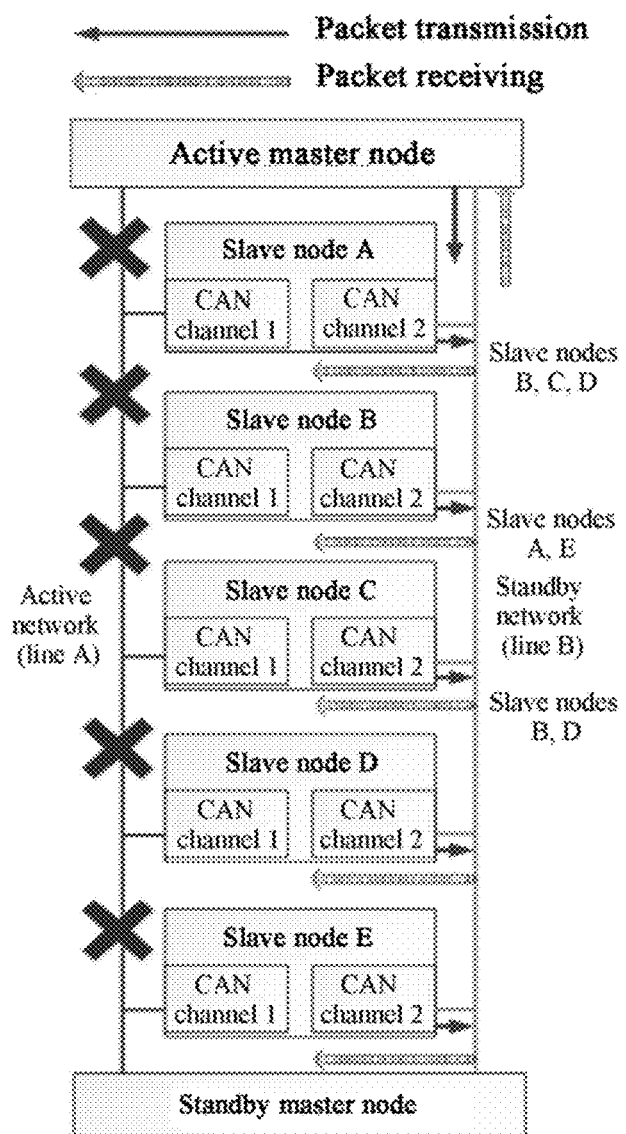
FIG. 5 is a schematic diagram of data receiving by each node in a case of a bus fault of an active network exemplified according to the present disclosure.

For example, as shown in FIG. 5, a bus of the active network has a short-circuit fault. In this case, all nodes on the active network are unable to communicate normally, and the error counter of each node keeps counting cumulatively. When each node determines that a channel of the active network gets into a bus-off state, the node switches to the standby network to receive desired data.

Further, based on the above description, in a practical application, the fault of the CAN channel may be not persistent, such as a suspension of operation caused by an abrupt change in a network speed. Therefore, to avoid waste of resources caused by unnecessary switching, in an embodiment of the present disclosure, a reset instruction is transmitted to the faulty CAN channel to determine, based on receipt status of the heartbeat packet transmitted after the resetting, whether a fault has actually occurred currently.

Specifically, in an embodiment of the present disclosure, after it is determined that no heartbeat packet of the first node is received within the preset first heartbeat period, instead of immediately determining that the first CAN channel is faulty, a reset instruction is transmitted to the first node from the active network so that the first CAN channel gets into an initial operation state.

Further, the heartbeat packet transmitted by the first node continues to be monitored on the active network. If no heartbeat packet of the first node is received in a preset second heartbeat period, it is learned that the first CAN channel of the first node is faulty, and services are switched to the standby network to monitor the heartbeat packet transmitted by the first node.

If the heartbeat packet of the first node is received in the preset second heartbeat period, it is learned that the fault of the first CAN channel of the first node is transient and has been removed by a reset operation. Therefore, the heartbeat packet transmitted by the first node needs to be monitored on the active network.

Based on the same principles, when the services are switched to the second CAN channel to receive the heartbeat packet transmitted by the first node, if no heartbeat packet transmitted by the first node through the second CAN channel is received in the preset first heartbeat period, instead of immediately determining that the second CAN channel has a communication fault, a reset instruction is transmitted to the first node from the standby network, and the heartbeat packet transmitted by the first node continues to be monitored on the standby network.

If the heartbeat packet transmitted by the first node through the second CAN channel is received within the preset second heartbeat period, it is learned that the fault of the second CAN channel of the first node is transient and has been removed by a reset operation. Therefore, the data transmitted by the first node needs to be received on the standby network, and the data transmitted by other slave nodes that normally transmit heartbeat packets needs to be received on the active network.

If no heartbeat packet transmitted by the first node through the second CAN channel is received in the preset second heartbeat period, it is learned that the second CAN channel of the first node is faulty.

According to the CANopen-based train network data transmission method provided in this embodiment of the present disclosure, the heartbeat packet transmitted through the first CAN channel by each slave node related to the active master node is monitored on the active network based on a preset network node list, and whether the first CAN channel of each slave node is faulty is determined based on the timing status of the heartbeat timer that is set corresponding to each slave node, and based on the receipt status of the heartbeat packet. In this way, if it is determined that no heartbeat packet of the first node is received within the preset first heartbeat period, then it is learned that the first CAN channel of the first node is faulty, and services are switched to the standby network to monitor the heartbeat packet transmitted by the first node through the second CAN channel. If a heartbeat packet transmitted by the first node through the second CAN channel is received within the preset first heartbeat period, the data transmitted by the first node needs to be received on the standby network, and at the same time, the data transmitted by other slave nodes other than the first node needs to be received on the active network. Therefore, when the active network of one or more slave nodes breaks down, services are switched to the standby network to receive the data of such slave nodes, and the data of other slave nodes is still received on the active network. This ensures complete receipt of the data of the related slave nodes and sound operation of the entire train, and improves redundancy effects of the train network.

Based on the foregoing embodiment, in order to further improve stability and reusability of the CANopen-based train network data transmission method, fault information of a current train network is displayed in real time based on data transmission status, thereby facilitating a relevant operator to fix faults as soon as possible based on the fault information, and improving stability of data transmission of the train network.

Figure 6:
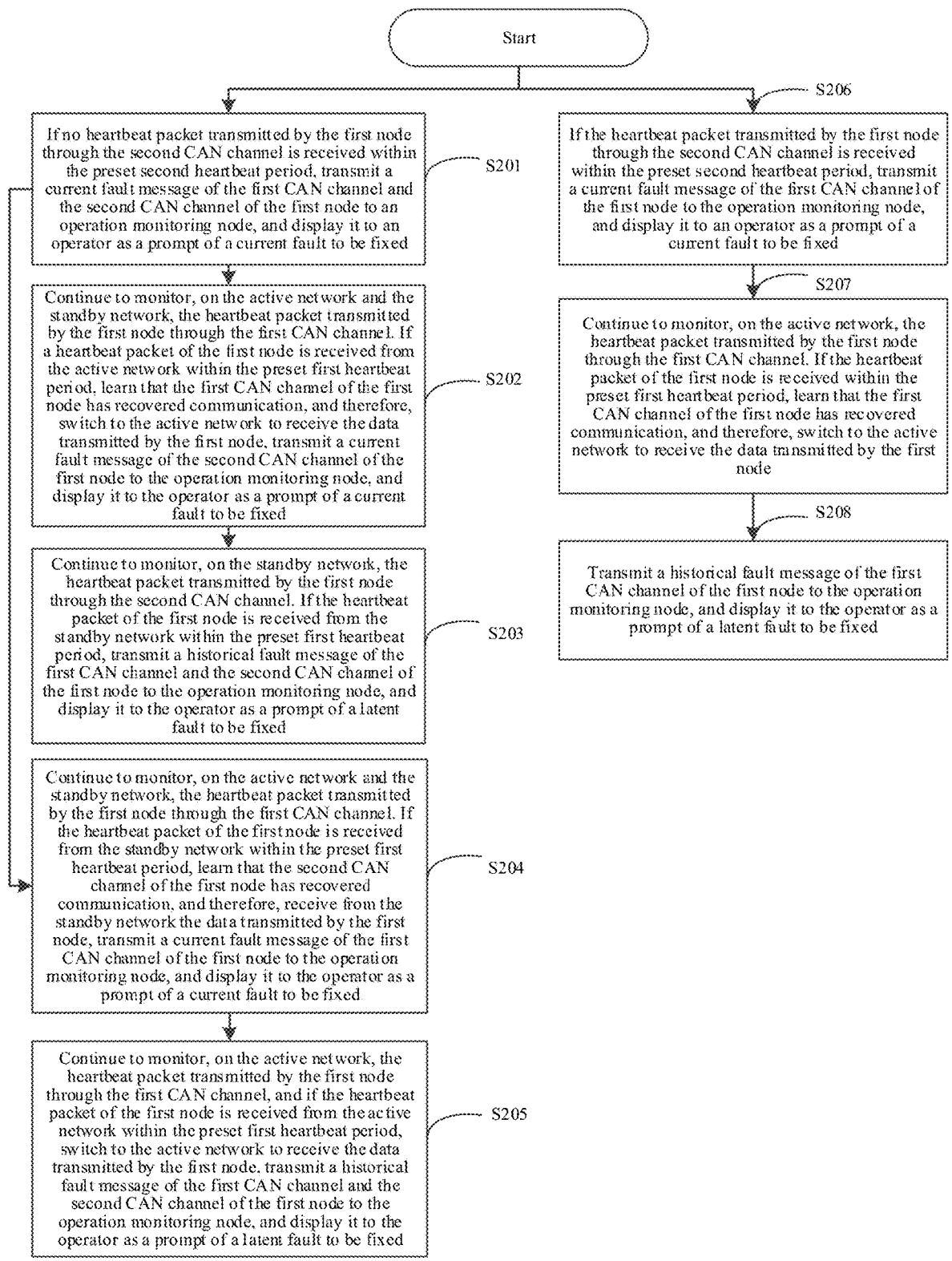
FIG. 6 is a flowchart of a CANopen-based train network data transmission method according to an embodiment of the present disclosure.

FIG. 6 is a flowchart of a CANopen-based train network data transmission method according to a second embodiment of the present disclosure. As shown in FIG. 6, after step S104, the method further includes the followings.

S201. If no heartbeat packet transmitted by the first node through the second CAN channel is received within the preset second heartbeat period, transmit a current fault message of the first CAN channel and the second CAN channel of the first node to an operation monitoring node, and display it to an operator as a prompt of a current fault to be fixed.

Further, durations of the first heartbeat period and the second heartbeat period may be user-defined to meet requirements of application scenarios, and the first heartbeat period may be the same as or different from the second heartbeat period.

In addition, depending on specific application requirements, the monitoring node may be one of different apparatuses such as a display screen of an instrument or an application interface of a terminal device, which is not limited herein.

Specifically, if no heartbeat packet transmitted by the first node through the second CAN channel is received within the preset second heartbeat period, it indicates that the second CAN channel is also faulty. Therefore, in order for a relevant operator to learn the fault information and handle the fault in time, a current fault message of the first CAN channel and the second CAN channel of the first node is transmitted to the operation monitoring node, and displayed to the operator as a prompt of a current fault to be fixed.

In this example, the preset second heartbeat period is equal to five heartbeat periods, and the operation monitoring node is a display screen. Therefore, if still no heartbeat packet of the first node is detected on the standby network in five consecutive heartbeat periods, the active master node directly informs the display screen of an instrument that both the active network and the standby network of the first node are faulty (the fault type is a current fault), and gives a prompt of troubleshooting the active network and the standby network of the node.

S202. Continue to monitor, on the active network and the standby network, the heartbeat packet transmitted by the first node through the first CAN channel. If the heartbeat packet of the first node is received from the active network within the preset first heartbeat period, determine that the first CAN channel of the first node has recovered communication, and therefore, switch to the active network to receive the data transmitted by the first node, transmit a current fault message of the second CAN channel of the first node to the operation monitoring node, and display it to the operator as a prompt of a current fault to be fixed.

Specifically, when both lines of a node have a communication fault, the active master node needs to continue to monitor the heartbeat packet of the node on the active network and the standby network. If either the active network or the standby network of the faulty node recovers communication midway, the node performs communication by using the recovered network.

For example, the heartbeat packet transmitted by the first node through the first CAN channel continues to be monitored on the active network and the standby network. If either the active network or the standby network of the faulty node recovers communication midway, that is, the active master node receives a heartbeat packet of the first node on the active network in five consecutive heartbeat periods, the active master node receives and processes the data of the first node on the recovered network, but still informs the operation monitoring node (such as the display screen of an instrument) that this network of the first node has a historical fault and the other network of the first node has a current fault.

S203. Continue to monitor, on the standby network, the heartbeat packet transmitted by the first node through the second CAN channel. If the heartbeat packet of the first node is received from the standby network within the preset first heartbeat period, transmit a historical fault message of the first CAN channel and the second CAN channel of the first node to the operation monitoring node, and display it to the operator as a prompt of a latent fault to be fixed.

To fully recover the train network to improve its stability, the heartbeat packet transmitted by the first node through the second CAN channel continues to be monitored on the standby network. For example, if both the active network and the standby network of the faulty node have recovered communication midway, the active master node only needs to process the data of the related slave node on the active network, but still informs the operation monitoring node (such as the display screen of an instrument) that both the active network and the standby network of the first node have a historical fault, thereby facilitating the relevant operator to eliminate safety hazards and improving safety stability of the train network.

S204. Continue to monitor, on the active network and the standby network, the heartbeat packet transmitted by the first node through the first CAN channel. If the heartbeat packet of the first node is received from the standby network within the preset first heartbeat period, determine that the second CAN channel of the first node has recovered communication, and therefore, receive from the standby network the data transmitted by the first node, transmit a current fault message of the first CAN channel of the first node to the operation monitoring node, and display it to the operator as a prompt of a current fault to be fixed.

Specifically, if the second CAN channel recovers communication earlier than the first CAN channel, the active master node receives from the standby network the data transmitted by the first node, transmits a current fault message of the first CAN channel of the first node to the operation monitoring node, and displays it to the operator as a prompt of a current fault to be fixed.

S205. Continue to monitor, on the active network, the heartbeat packet transmitted by the first node through the first CAN channel, and if the heartbeat packet of the first node is received from the active network within the preset first heartbeat period, switch to the active network to receive the data transmitted by the first node, transmit a historical fault message of the first CAN channel and the second CAN channel of the first node to the operation monitoring node, and display it to the operator as a prompt of a latent fault to be fixed.

Specifically, when receiving over the standby network the data transmitted through the second CAN channel, the active master node determines, based on the preset first heartbeat period and the receipt status of the heartbeat packet, whether the first CAN channel of the first node recovers communication. If the communication is recovered, the active master node switches to the active network to receive the data transmitted by the first node, transmits a historical fault message of the first CAN channel and the second CAN channel of the first node to the operation monitoring node, and displays it to the operator as a prompt of a latent fault to be fixed.

S206. If the heartbeat packet transmitted by the first node through the second CAN channel is received within the preset second heartbeat period, transmit a current fault message of the first CAN channel of the first node to the operation monitoring node, and display it to an operator as a prompt of a current fault to be fixed.

Specifically, if a heartbeat packet transmitted by the first node through the second CAN channel is received within the preset second heartbeat period, it indicates that the second CAN channel provides data services normally. Therefore, the active master node receives and processes the related data of the node on the standby network, and still receives and processes the data of other nodes on the active network. At the same time, the active master node informs the operation monitoring node (such as the display screen of an instrument) that the first CAN channel of the first node is faulty (the fault type is a current fault), and gives a prompt of troubleshooting the active network of the first node.

S207. Continue to monitor, on the active network, the heartbeat packet transmitted by the first node through the first CAN channel, and if the heartbeat packet of the first node is received within the preset first heartbeat period, determine that the first CAN channel of the first node has recovered communication, and switch to the active network to receive the data transmitted by the first node.

S208. Transmit a historical fault message of the first CAN channel of the first node to the operation monitoring node, and display it to the operator as a prompt of a latent fault to be fixed.

Specifically, after prompting the relevant operator to troubleshoot the active network of the first node, the active master node continues to monitor, on the active network, the heartbeat packet transmitted by the first node through the first CAN channel. If the faulty active network of the first node recovers communication midway, for example, if the active master node successfully receives the heartbeat packet of the first node on the active network in five consecutive heartbeat periods, the active master node switches back to the active network to receive the data of the first node, stops the processing on the standby network, but still informs the operation monitoring node (such as the display screen of an instrument) that the active network of the first node is faulty (the fault type is a historical fault), and also gives a prompt of troubleshooting the active network of the first node and checking for latent faults.

Accordingly, the CANopen-based train network data transmission method provided in this embodiment of the present disclosure selects the active network or the standby network based on real-time status of the train network, and displays corresponding information on the monitoring node as a prompt to the relevant operator, thereby improving stability and reusability of the train network data transmission method.

To further clarify the CANopen-based train network data transmission method provided in this embodiment of the present disclosure, the following describes the method from a perspective of a slave node side.

Design requirements on the slave node are as follows:

After being powered on and receiving a startup instruction from the active master node, the slave node goes live, and transmits PDO data according to its own functions and a synchronization packet frequency of the active master node. The slave node should transmit data to the active network and the standby network simultaneously, but by default, receive special object packets such as a synchronization packet of the active master node and a timestamp from only the active network. The slave node does not switch to the standby network to receive data until no special object packet is received on the active network from the active master node within five consecutive packet periods. If still no special object packet is received on the standby network from the active master node within five consecutive packet periods, then each slave node gets into a special processing mode.

Figure 7:
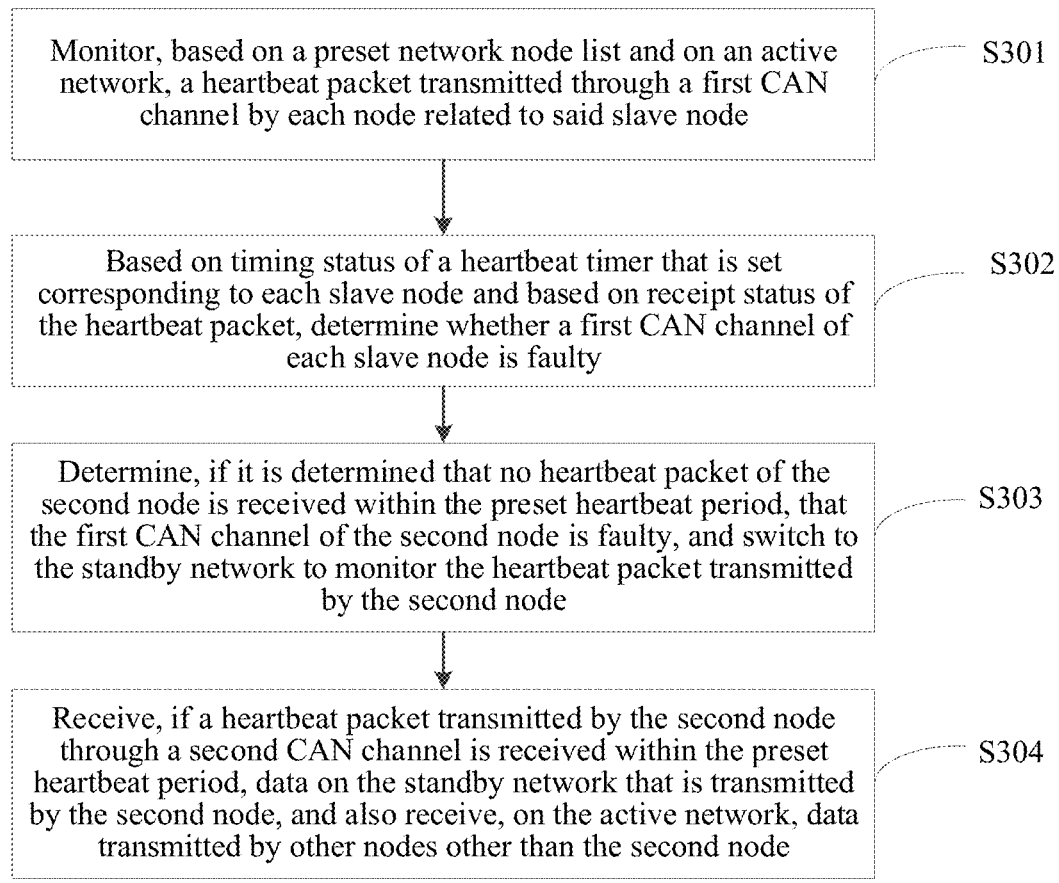
FIG. 7 is a flowchart of a CANopen-based train network data transmission method according to an embodiment of the present disclosure.

FIG. 7 is a flowchart of a CANopen-based train network data transmission method according to a third embodiment of the present disclosure. As shown in FIG. 7, the method includes the following steps.

S301. Monitor, based on a preset network node list and on an active network, a heartbeat packet transmitted through a first CAN channel by each node related to the slave node.

Understandably, based on a network topology view, a network node list corresponding to the slave node is created beforehand, where the network node list includes an identifier of each node related to the slave node and a corresponding heartbeat timer.

Further, the slave node receives from the active network a network control instruction transmitted by the active master node to trigger the first CAN channel and a second CAN channel to get into a heartbeat packet operation mode, and starts a heartbeat timer corresponding to each slave node related to the slave node.

Specifically, after going live, the slave node performs a heartbeat packet monitoring mechanism. Based on a topology view, the slave node creates a node list related to it (including the active master node, configurable). To be specific, the slave node sets up a specific object index storage space in an object dictionary for node IDs of the related nodes. The slave node sets a heartbeat timer for each node related to it. After the slave node goes live, each heartbeat timer counts down. The slave node parses a received heartbeat packet to obtain a corresponding node ID, matches the node ID with a node ID list in its own object dictionary, and then resets a heartbeat timer corresponding to a matched node so that timing starts over.

In a practical application, by default, each slave node monitors heartbeat packet transmission status of the related slave nodes on the active network based on the network node list.

S302. Determine, based on timing status of a heartbeat timer that is set corresponding to each slave node and based on receipt status of the heartbeat packet, whether a first CAN channel of each slave node is faulty.

Specifically, if the first CAN channel of the slave node is in proper communication, the slave node can normally receive the heartbeat packet from the related slave node within a specified time. Otherwise, the first CAN channel of the related slave node is in faulty communication.

Certainly, in some circumstances, the slave node may fail in normally receiving the heartbeat packet from the related slave node due to some other reasons. For example, network signals are subjected to abrupt interference. Therefore, in order to avoid misjudgment and accurately determine whether the first CAN channels of the slave nodes are faulty, the timing status of the heartbeat timers that are set corresponding to the slave nodes and the receipt status of the heartbeat packets are taken into overall consideration, to determine whether the first CAN channels of the related slave nodes are faulty.

For example, when no heartbeat packet of a slave node is detected within five heartbeat periods, it is determined that the first CAN channel of the slave node may be faulty.

S303. Learn, if it is determined that no heartbeat packet of the second node is received within the preset heartbeat period, that the first CAN channel of the second node is faulty, and switch to the standby network to monitor the heartbeat packet transmitted by the second node.

The second node is any slave node related to the slave node or is an active master node.

Understandably, in a practical application, if it is determined that no heartbeat packet of the second node is received within the preset heartbeat period, it is learned that the first CAN channel of the second node is faulty. Therefore, to keep normal operation of a train network, services are switched to the standby network to monitor the heartbeat packet transmitted by the second node through the second CAN channel.

The second node is a slave node whose first CAN channel is faulty, and may be singular or plural in number depending on specific application scenarios.

S304. If a heartbeat packet transmitted by the second node through the second CAN channel is received within the preset heartbeat period, receive data on the standby network that is transmitted by the second node, and also receive, on the active network, data transmitted by other nodes that normally transmit heartbeat packets.

Specifically, if a heartbeat packet transmitted by the second node through the second CAN channel is received within the preset heartbeat period, it indicates that the second CAN channel functions normally. Therefore, the data transmitted by the second node needs to be received on the standby network.

In the foregoing description of the embodiments of the present disclosure, it is assumed that the active network and the standby network have no communication fault. In a practical application, however, the active network and the standby network may be faulty. Therefore, after going live, the slave node also performs a bus fault determining mechanism.

In other words, the slave node monitors bus status of the active network and the standby network in real time (by using an error counter). When the first CAN channel of the slave node is faulty (voltage of a CAN line is abnormal, bus-off caused by too many frame errors, etc.), services are switched to the standby network promptly to process data of all slave nodes. Meanwhile, each slave node records that the active network is currently in a bus communication fault state. If the standby network also has a bus fault currently, the communications network has broken down, and all nodes get into a special operation state of the train.

Specifically, if the count of a transmission error counter or a receipt error counter in the slave node adds up to a preset value, it is learned that the active network is faulty, and services are switched to the standby network to communicate with other nodes.

Thus, according to the CANopen-based train network data transmission method provided in this embodiment of the present disclosure, the heartbeat packet transmitted through the first CAN channel by each slave node related to the slave node is monitored on the active network based on a preset network node list, and whether the first CAN channel of each slave node is faulty is determined based on the timing status of the heartbeat timer that is set corresponding to each slave node, and based on the receipt status of the heartbeat packet. If it is determined that no heartbeat packet of the second node is received within the preset heartbeat period, then it is learned that the first CAN channel of the second node is faulty, and services are switched to the standby network to monitor the heartbeat packet transmitted by the second node through the second CAN channel. If a heartbeat packet transmitted by the second node through the second CAN channel is received within the preset heartbeat period, the data transmitted by the second node needs to be received on the standby network, and at the same time, the data transmitted by other nodes that normally transmit heartbeat packets needs to be received on the active network. Therefore, when the active network of one or more slave nodes breaks down, services are switched to the standby network to receive the data of such slave nodes, and the data of other slave nodes is still received on the active network. This ensures complete receipt of the data of the related slave nodes and sound operation of the entire train, and improves redundancy effects of the train network.

Based on the foregoing embodiments, to further improve stability and reusability of the CANopen-based train network data transmission method, the slave node keeps a record of data transmission status, and displays fault information of a current train network in real time, thereby helping a relevant operator fix faults as soon as possible based on the fault information.

Figure 8:
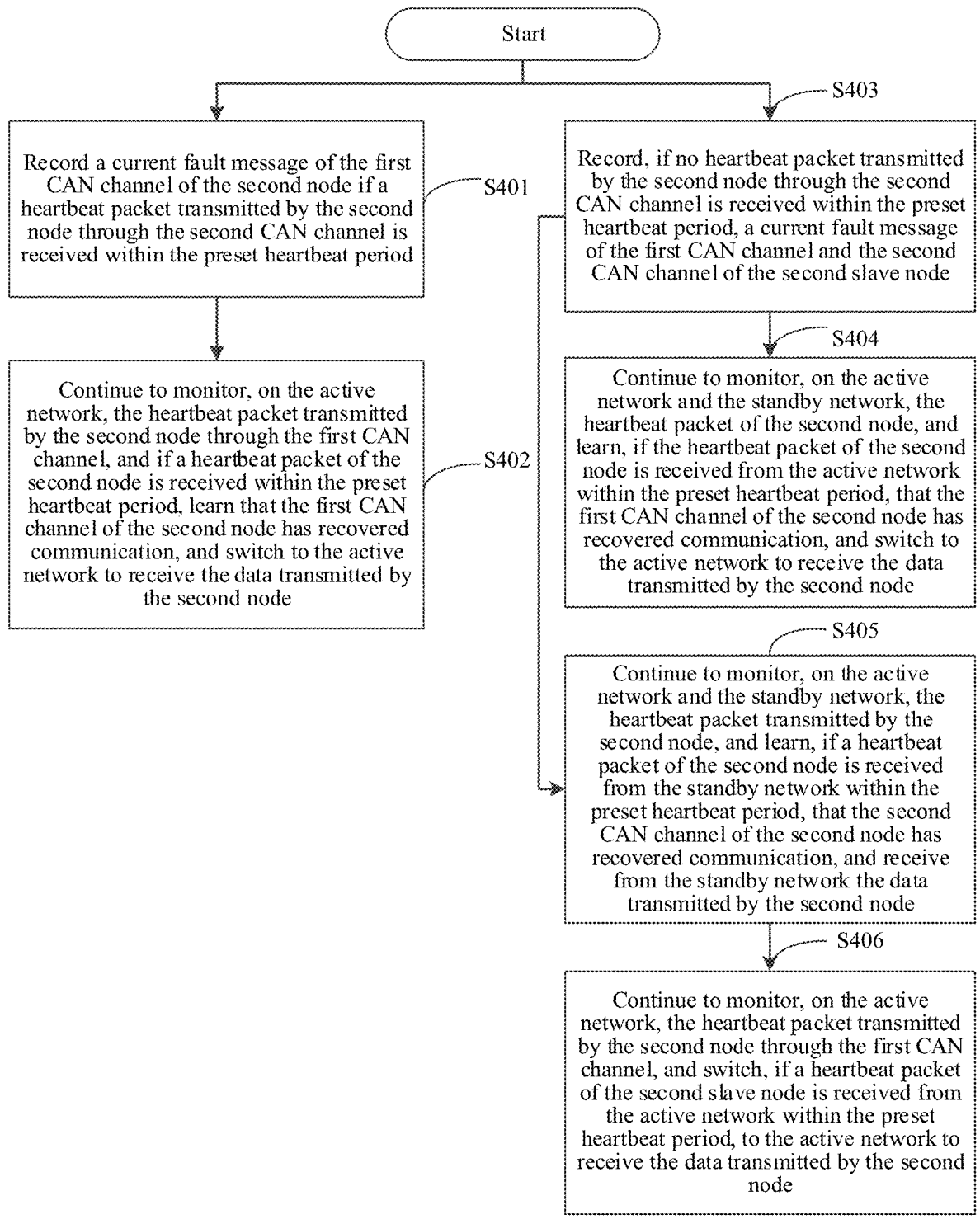
FIG. 8 is a flowchart of a CANopen-based train network data transmission method according to an embodiment of the present disclosure.

FIG. 8 is a flowchart of a CANopen-based train network data transmission method according to a fourth embodiment of the present disclosure. As shown in FIG. 8, after step S304, the method further includes the followings.

S401. Record a current fault message of the first CAN channel of the second node if a heartbeat packet transmitted by the second node through the second CAN channel is received within the preset heartbeat period.

Specifically, if the slave node successfully receives the data transmitted by the second node whose active network has broken down, the slave node receives and processes, on the standby network, data related to the second node, still receives and processes data of other slave nodes on the active network, and records a communication fault of the active network of the second node.

S402. Continue to monitor, on the active network, the heartbeat packet transmitted by the second node through the first CAN channel, and if a heartbeat packet of the second node is received within the preset heartbeat period, determine that the first CAN channel of the second node has recovered communication, and switch to the active network to receive the data transmitted by the second node.

Specifically, if the faulty active network of the second node recovers communication midway, for example, if the slave node successfully receives a heartbeat packet of the second node on the active network within 10 consecutive heartbeat periods, the slave node switches back to the active network to receive the data of the second node and stops the processing on the standby network.

S403. Record, if no heartbeat packet transmitted by the second node through the second CAN channel is received within the preset heartbeat period, a current fault message of the first CAN channel and the second CAN channel of the second node.

Specifically, if no heartbeat packet transmitted by the second node through the second CAN channel is received within the preset heartbeat period, for example, if still no heartbeat packet of the second node is detected on the standby network within five consecutive heartbeat periods, the slave node determines that the second node has broken down, and records communication faults of the active network and the standby network of the second node.

S404. Continue to monitor, on the active network and the standby network, the heartbeat packet of the second node, and learn, if the heartbeat packet of the second node is received from the active network within the preset heartbeat period, that the first CAN channel of the second node has recovered communication, and switch to the active network to receive the data transmitted by the second node.

Specifically, when communication faults occur on both lines of the second node, the second node needs to continue to monitor the heartbeat packet of the second node on the active network and the standby network. If either the active network or the standby network of the faulty node recovers communication midway, for example, if the second node successfully receives a heartbeat packet of the second node on the active network in three consecutive heartbeat periods, then the slave node receives and processes the data of the second node on the recovered active network, but still records that the active network of the second node has a historical fault and that the standby network of the second node has a current fault.

S405. Continue to monitor, on the active network and the standby network, the heartbeat packet transmitted by the second node, and learn, if a heartbeat packet of the first slave node is received from the standby network within the preset heartbeat period, that the second CAN channel of the second node has recovered communication, and receive from the standby network the data transmitted by the second node.

For example, if the second node successfully receives a heartbeat packet of the second node on the standby network in three consecutive heartbeat periods, the slave node receives and processes the data of the second node on the recovered standby network, but still records that the standby network of the second node has a historical fault and that the active network of the second node has a current fault.

S406. Continue to monitor, on the active network, the heartbeat packet transmitted by the second node through the first CAN channel, and switch, if a heartbeat packet of the second node is received from the active network within the preset heartbeat period, to the active network to receive the data transmitted by the second node.

Specifically, if both the active network and the standby network of the faulty node recover communication midway, the slave node needs only to process the data of the node on the active network, but still records that both the active network and the standby network of the node have historical faults.

It should be emphasized that the CANopen-based train network data transmission method described from a perspective of the active master node side corresponds to the CANopen-based train network data transmission method described from a perspective of the slave node side, and is based on similar implementation principles, details of which are omitted in this embodiment.

Thus, the CANopen-based train network data transmission method provided in this embodiment of the present disclosure selects the active network or the standby network based on real-time status of the train network, and displays corresponding information on the monitoring node as a prompt to the relevant operator, thereby improving stability and reusability of the train network data transmission method.

Figure 9:
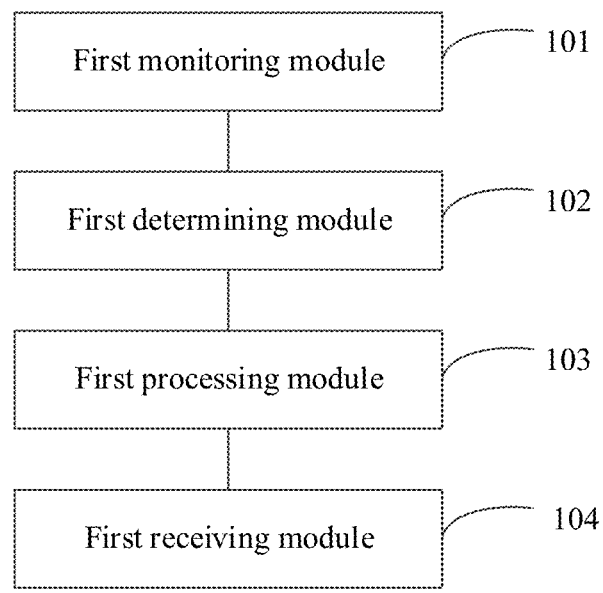
FIG. 9 is a schematic structural diagram of an active master node according to an embodiment of the present disclosure.

To implement the foregoing embodiments, the present disclosure provides an active master node. FIG. 9 is a schematic structural diagram of an active master node according to a first embodiment of the present disclosure. As shown in FIG. 9, the active master node includes: a first monitoring module 101, a first determining module 102, a first processing module 103, and a first receiving module 104.

The first monitoring module 101 is configured to monitor, on an active network and based on a preset network node list, a heartbeat packet transmitted through a first CAN channel by each slave node related to the active master node.

Figure 10:
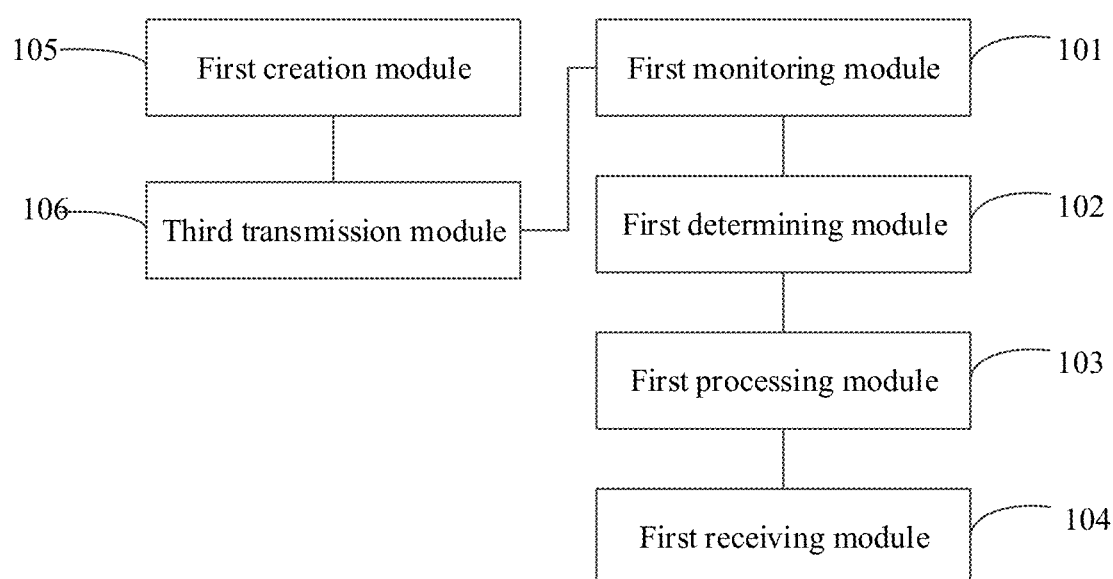
FIG. 10 is a schematic structural diagram of an active master node according to an embodiment of the present disclosure.

FIG. 10 is a schematic structural diagram of an active master node according to a second embodiment of the present disclosure. As shown in FIG. 10, on the basis of what is shown in FIG. 9, the active master node further includes a first creation module 105, and a third transmission module 106.

The first creation module 105 is configured to create, based on a network topology view, a network node list corresponding to the active master node, where the network node list includes an identifier of each slave node related to the active master node and a corresponding heartbeat timer.

The third transmission module 106 is configured to transmit a network control instruction to all slave nodes from the active network and a standby network to control a first CAN channel and a second CAN channel of the slave nodes to get into a heartbeat packet operation mode, and start a heartbeat timer corresponding to each slave node related to the active master node.

The first determining module 102 is configured to, based on timing status of a heartbeat timer that is set corresponding to each slave node and based on receipt status of the heartbeat packet, determine whether a first CAN channel of each slave node is faulty.

The first processing module 103 is configured to learn, if no heartbeat packet of a first node is received within a preset first heartbeat period, that a first CAN channel of the first node is faulty, and control the first monitoring module to switch to the standby network to monitor the heartbeat packet transmitted by the first node, where the first node is any slave node related to the active master node.

In an embodiment of the present disclosure, the first processing module 103 is further configured to learn, if the count of a transmission error counter or a receipt error counter in the active master node adds up to a preset value, that the active network is faulty, and switch to the standby network to communicate with other nodes.

The first receiving module 104 is configured to receive, when a heartbeat packet transmitted by the first node through a second CAN channel is received within the preset first heartbeat period, data on the standby network that is transmitted by the first node, and also receive, on the active network, data transmitted by other slave nodes that normally transmit heartbeat packets.

In an embodiment of the present disclosure, the first receiving module 104 is further configured to: when a heartbeat packet of the first node is received within the preset first heartbeat period, receive from the active network the data transmitted by the first node.

Figure 11:
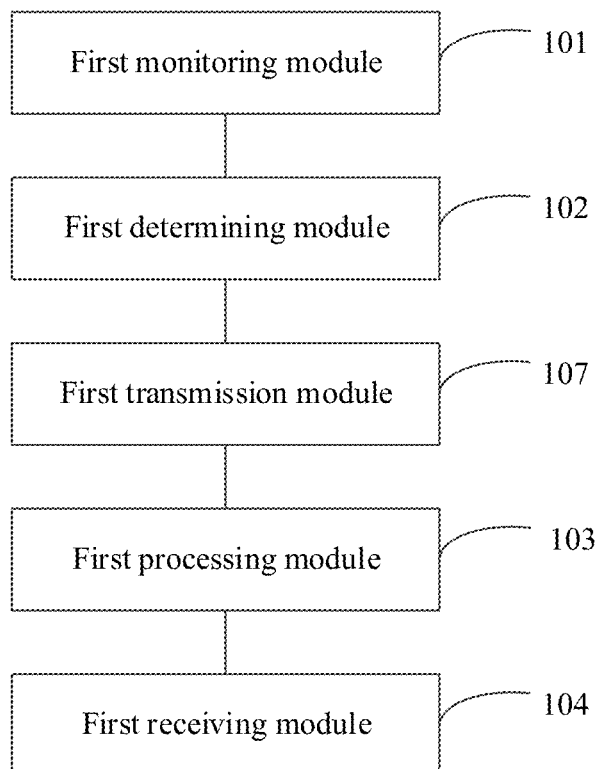
FIG. 11 is a schematic structural diagram of an active master node according to an embodiment of the present disclosure.

In an embodiment of the present disclosure, FIG. 11 is a schematic structural diagram of an active master node according to a third embodiment of the present disclosure. As shown in FIG. 11, on the basis of what is shown in FIG. 9, the active master node further includes a first transmission module 107.

The first transmission module 107 is configured to transmit a reset instruction to the first node from the active network when it is determined that no heartbeat packet of the first node is received within the preset first heartbeat period.

The first processing module 103 is further configured to learn, if no heartbeat packet of the first node is received within a preset second heartbeat period, that the first CAN channel of the first node is faulty, and switch to the standby network to monitor the heartbeat packet transmitted by the first node.

Figure 12:
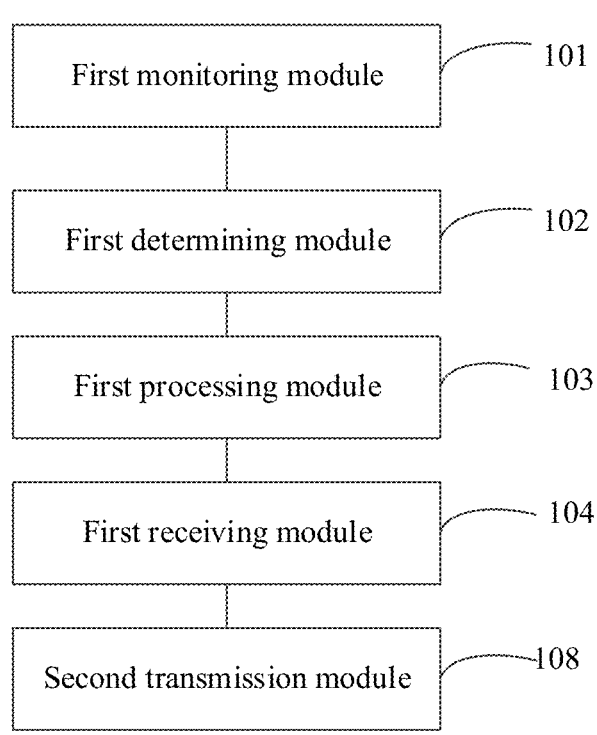
FIG. 12 is a schematic structural diagram of an active master node according to an embodiment of the present disclosure.

FIG. 12 is a schematic structural diagram of an active master node according to a fourth embodiment of the present disclosure. As shown in FIG. 12, on the basis of what is shown in FIG. 9, the active master node further includes a second transmission module 108.

The first transmission module 108 is configured to transmit a reset instruction to the first node from the standby network when no heartbeat packet transmitted by the first node through the second CAN channel is received within a preset second heartbeat period.

The first monitoring module 101 is further configured to continue to monitor, on the standby network, the heartbeat packet transmitted by the first node.

The first receiving module 104 is further configured to receive, when a heartbeat packet transmitted by the first node through a second CAN channel is received within the preset second heartbeat period, data on the standby network that is transmitted by the first node, and also receive, on the active network, data transmitted by other slave nodes that normally transmit heartbeat packets.

Thus, the active master node provided in this embodiment of the present disclosure monitors, on the active network and based on a preset network node list, the heartbeat packet transmitted through the first CAN channel by each node related to the slave node, and determines whether the first CAN channel of each slave node is faulty based on the timing status of the heartbeat timer that is set corresponding to each slave node, and based on the receipt status of the heartbeat packet. If it is determined that no heartbeat packet of the second node is received within the preset first heartbeat period, then it is learned that the first CAN channel of the second node is faulty, and services are switched to the standby network to monitor the heartbeat packet transmitted by the second node through the second CAN channel. If a heartbeat packet transmitted by the second node through the second CAN channel is received within the preset first heartbeat period, the data transmitted by the second node needs to be received on the standby network, and at the same time, the data transmitted by other slave nodes that normally transmit heartbeat packets needs to be received on the active network. Therefore, when the active network of one or more slave nodes breaks down, services are switched to the standby network to receive the data of such slave nodes, and the data of other slave nodes is still received on the active network. This ensures complete receipt of the data of the related slave nodes and sound operation of the entire train, and improves redundancy effects of the train network.

Figure 13:
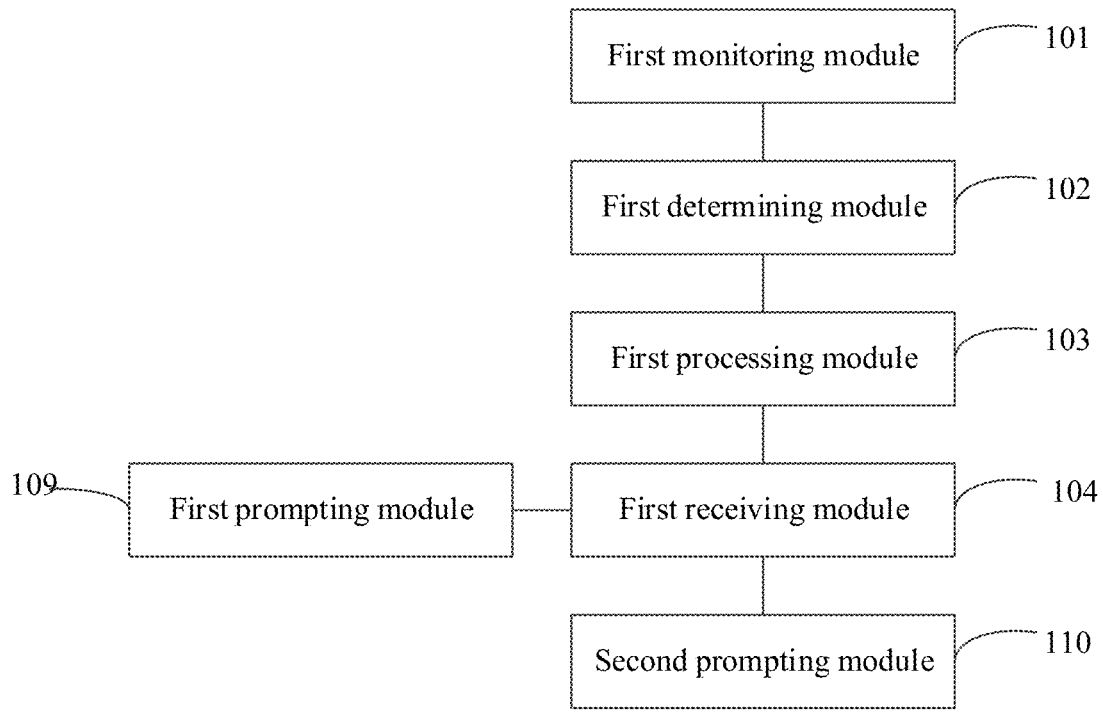
FIG. 13 is a schematic structural diagram of an active master node according to an embodiment of the present disclosure.

FIG. 13 is a schematic structural diagram of an active master node according to a fifth embodiment of the present disclosure. As shown in FIG. 13, on the basis of what is shown in FIG. 9, the active master node further includes a first prompting module 109, and a second prompting module 110.

The first prompting module 109 is configured to transmit, after a heartbeat packet transmitted by the first node through the second CAN channel is received, a current fault message of the first CAN channel of the first node to an operation monitoring node as a prompt of a current fault to be fixed.

In one embodiment, the first monitoring module 101 is further configured to continue to monitor, on the active network, the heartbeat packet transmitted by the first node through the first CAN channel.

The first processing module 103 is further configured to learn, when the heartbeat packet of the first node is received within the preset first heartbeat period, that the first CAN channel of the first node has recovered communication, and control the first receiving module 104 to switch to the active network to receive the data transmitted by the first node.

In an embodiment of the present disclosure, the first prompting module 109 is further configured to transmit a historical fault message of the first CAN channel of the first node to the operation monitoring node, and display the historical fault message to an operator as a prompt of a latent fault to be fixed.

The second prompting module 110 is configured to transmit, when no heartbeat packet transmitted by the first node through the second CAN channel is received within the preset first heartbeat period, a current fault message of the first CAN channel and the second CAN channel of the first node to the operation monitoring node, and display the current fault message to the operator as a prompt of a current fault to be fixed.

In one embodiment, the first monitoring module 101 is further configured to continue to monitor, on the active network and the standby network, the heartbeat packet transmitted by the first node through the first CAN channel.

The first processing module 103 is further configured to learn, when a heartbeat packet of the first node is received from the active network within the preset first heartbeat period, that the first CAN channel of the first node has recovered communication, and control the first receiving module to switch to the active network to receive the data transmitted by the first node.

The second prompting module 110 is further configured to transmit a current fault message of the second CAN channel of the first node to an operation monitoring node, and display the current fault message to an operator as a prompt of a current fault to be fixed.

The first monitoring module 101 is further configured to continue to monitor, on the standby network, the heartbeat packet transmitted by the first node through the second CAN channel.

The second prompting module 110 is further configured to transmit, when a heartbeat packet of the first node is received from the standby network within the preset first heartbeat period, a historical fault message of the first CAN channel and the second CAN channel of the first node to the operation monitoring node, and display the historical fault message to the operator as a prompt of a latent fault to be fixed.

In an embodiment of the present disclosure, the first monitoring module 101 is further configured to continue to monitor, on the active network and the standby network, the heartbeat packet transmitted by the first node through the first CAN channel.

The first processing module 103 is further configured to learn, when a heartbeat packet of the first node is received from the standby network within the preset first heartbeat period, that the second CAN channel of the first node has recovered communication, and control the first receiving module 104 to receive from the standby network the data transmitted by the first node.

The first monitoring module 101 is further configured to continue to monitor, on the active network, the heartbeat packet transmitted by the first node through the first CAN channel.

The first processing module 103 is further configured to switch, if a heartbeat packet of the first node is received from the active network within the preset first heartbeat period, to the active network to receive the data transmitted by the first node.

In an embodiment of the present disclosure, the first processing module 103 is further configured to switch, when the active master node is detected as faulty, to the standby master node to exchange data with other related slave nodes.

The second prompting module 110 is further configured to transmit a historical fault message of the first CAN channel and the second CAN channel of the first node to an operation monitoring node, and display the historical fault message to an operator as a prompt of a latent fault to be fixed.

It should be noted that the CANopen-based train network data transmission method described above from a perspective of an active master node side is also applicable to the active master node described in this embodiment of the present disclosure, and is based on similar implementation principles, the details of which are omitted herein.

Thus, the active master node provided in this embodiment of the present disclosure selects the active network or the standby network based on real-time status of a train network, and displays corresponding information on the monitoring node as a prompt to the relevant operator, thereby improving stability and reusability of the train network data transmission method.

Figure 14:
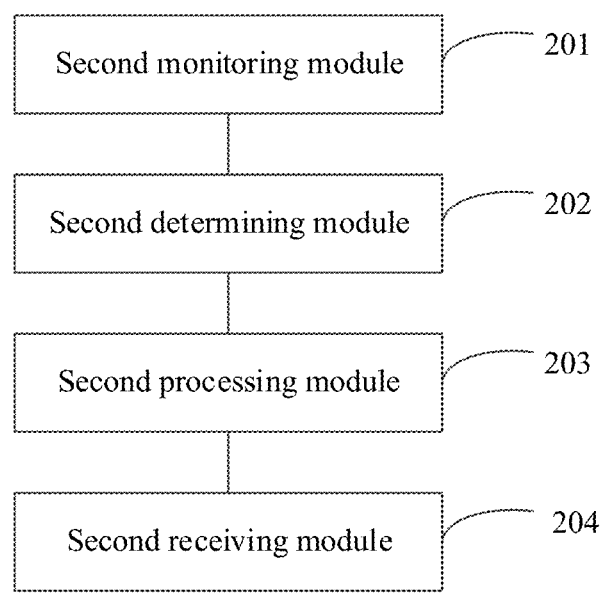
FIG. 14 is a schematic structural diagram of a slave node according to an embodiment of the present disclosure.

To implement the foregoing embodiments, the present disclosure also provides a slave node. FIG. 14 is a schematic structural diagram of a slave node according to a first embodiment of the present disclosure. As shown in FIG. 14, the slave node includes: a second monitoring module 201, a second determining module 202, a second processing module 203, and a second receiving module 204.

The second monitoring module 201 is configured to monitor, on an active network and based on a preset network node list, a heartbeat packet transmitted through a first CAN channel by each node related to the slave node.

Figure 15:
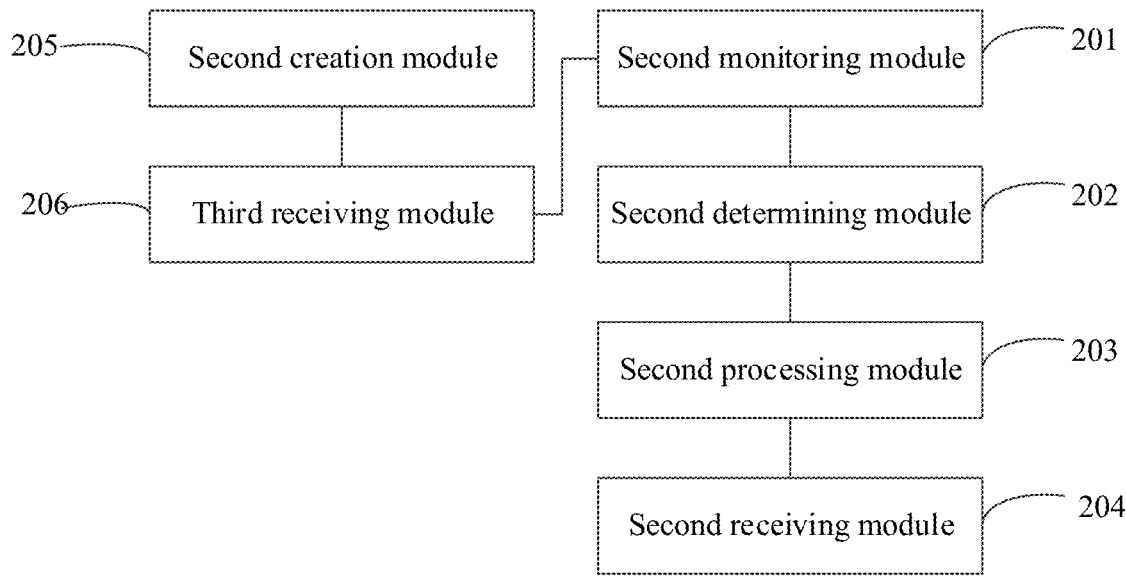
FIG. 15 is a schematic structural diagram of a slave node according to an embodiment of the present disclosure.

FIG. 15 is a schematic structural diagram of a slave node according to a second embodiment of the present disclosure. As shown in FIG. 15, on the basis of what is shown in FIG. 14, the slave node further includes a second creation module 205, and a third receiving module 206.

The second creation module 205 is configured to create, based on a network topology view, a network node list corresponding to the slave node, where the network node list includes an identifier of each slave node related to the slave node and a corresponding heartbeat timer.

The third receiving module 206 is configured to receive, from the active network, a network control instruction transmitted by the active master node to trigger a first CAN channel and a second CAN channel to get into a heartbeat packet operation mode, and start a heartbeat timer corresponding to each slave node related to the slave node.

The second determining module 202 is configured to, based on timing status of a heartbeat timer that is set corresponding to each slave node and based on receipt status of the heartbeat packet, determine whether a first CAN channel of each slave node is faulty.

The second processing module 203 is configured to learn, if it is determined that no heartbeat packet of a second node is received within a preset first heartbeat period, that a first CAN channel of the second node is faulty, and switch to a standby network to monitor the heartbeat packet transmitted by the second node, where the second node is any slave node related to the slave node or is an active master node.

In an embodiment of the present disclosure, the second processing module 203 is further configured to learn, if the count of a transmission error counter or a receipt error counter in the slave node adds up to a preset value, that the active network is faulty, and switch to the standby network to communicate with other nodes.

The second receiving module 204 is configured to receive, when a heartbeat packet transmitted by the second node through the second CAN channel is received within the preset first heartbeat period, data on the standby network that is transmitted by the second node, and also receive, on the active network, data transmitted by other nodes that normally transmit heartbeat packets.

Thus, the slave node provided in this embodiment of the present disclosure monitors, on the active network and based on a preset network node list, the heartbeat packet transmitted through the first CAN channel by each slave node related to the slave node, and determines whether the first CAN channel of each slave node is faulty based on the timing status of the heartbeat timer that is set corresponding to each slave node, and based on the receipt status of the heartbeat packet. If it is determined that no heartbeat packet of the second node is received within the preset first heartbeat period, then it is learned that the first CAN channel of the second node is faulty, and services are switched to the standby network to monitor the heartbeat packet transmitted by the second node through the second CAN channel. If a heartbeat packet transmitted by the second node through the second CAN channel is received within the preset first heartbeat period, the data transmitted by the second node needs to be received on the standby network, and at the same time, the data transmitted by other nodes that normally transmit heartbeat packets needs to be received on the active network. Therefore, when the active network of one or more slave nodes breaks down, services are switched to the standby network to receive the data of such slave nodes, and the data of other slave nodes is still received on the active network. This ensures complete receipt of the data of the related slave nodes and sound operation of the entire train, and improves redundancy effects of the train network.

Figure 16:
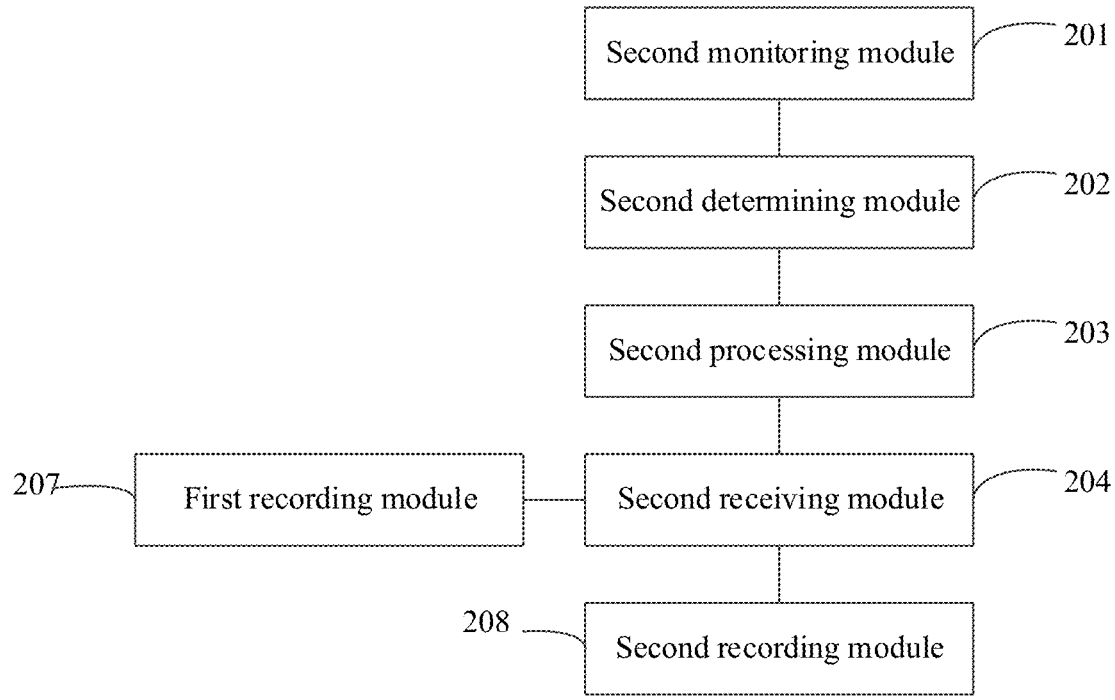
FIG. 16 is a schematic structural diagram of a slave node according to an embodiment of the present disclosure.

FIG. 16 is a schematic structural diagram of a slave node according to a third embodiment of the present disclosure. As shown in FIG. 16, on the basis of what is shown in FIG. 14, the slave node further includes a first recording module 207, and a second recording module 208.

The first recording module 207 is configured to record a current fault message of the first CAN channel of the second node after a heartbeat packet transmitted by the second node through the second CAN channel is received within the preset heartbeat period.

The second monitoring module 201 is further configured to continue to monitor, on the active network, the heartbeat packet transmitted by the second node through the first CAN channel.

The second processing module 203 is further configured to learn, when a heartbeat packet of the second node is received within the preset heartbeat period, that the first CAN channel of the second node has recovered communication, and control the second receiving module 204 to switch to the active network to receive the data transmitted by the second node.

The second recording module 208 is configured to record a current fault message of the first CAN channel and the second CAN channel of the second node when no heartbeat packet transmitted by the second node through the second CAN channel is received within the preset heartbeat period after services are switched to the standby network to monitor the heartbeat packet transmitted by the second node through the second CAN channel.

In one embodiment, the second monitoring module 201 is further configured to continue to monitor the heartbeat packet of the second node on the active network and the standby network.

The second processing module 203 is further configured to learn, when a heartbeat packet of the second node is received from the active network within the preset heartbeat period, that the first CAN channel of the second node has recovered communication, and control the second switching module 204 to switch to the active network to receive the data transmitted by the second node.

In an embodiment of the present disclosure, the second monitoring module is further configured to continue to monitor, on the active network and the standby network, the heartbeat packet transmitted by the second node.

The second receiving module 204 is further configured to learn, when a heartbeat packet of the first slave node is received from the standby network within the preset heartbeat period, that the second CAN channel of the second node has recovered communication, and receive from the standby network the data transmitted by the second node.

The second monitoring module 201 is further configured to continue to monitor, on the active network, the heartbeat packet transmitted by the second node through the first CAN channel.

The second processing module 203 is further configured to control, if a heartbeat packet of the second node is received from the active network within the preset heartbeat period, the second switching module to switch to the active network to receive the data transmitted by the second node.

It should be noted that the CANopen-based train network data transmission method described above from a perspective of a slave node side is also applicable to the slave node described in one embodiment of the present disclosure, and is based on similar implementation principles, the details of which are omitted herein.

Thus, the slave node provided in this embodiment of the present disclosure selects the active network or the standby network based on real-time status of a train network, and displays corresponding information on the monitoring node as a prompt to the relevant operator, thereby improving stability and reusability of the train network data transmission method.

Figure 17:
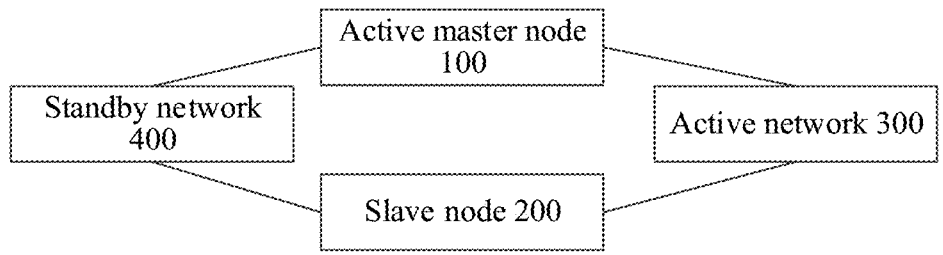
FIG. 17 is a schematic structural diagram of a CANopen-based train network data transmission system according to an embodiment of the present disclosure.

To implement the foregoing embodiments, the present disclosure also provides a CANopen-based train network data transmission system. FIG. 17 is a schematic structural diagram of a CANopen-based train network data transmission system according to an embodiment of the present disclosure. As shown in FIG. 17, the CANopen-based train network data transmission system includes an active master node 100, a slave node 200, an active network 300, and a standby network 400.

Description of the active master node 100 and the slave node 200 is available from the foregoing embodiments, and is omitted in this embodiment.

To better clarify technical effects of the CANopen-based train network data transmission system provided in this embodiment of the present disclosure, the following gives a description in comparison with the prior art.

In the related art, few failure scenarios are considered in a network redundancy design applied to a train that uses a CAN bus as a communications network. All nodes simultaneously transmit data on both the active network and the standby network, but receive data on only one of the networks. No matter which node on the active network has broken down, all nodes related to the down node switch to the standby network to receive and process data of the down node and data of other related nodes. Therefore, when different channels of multiple nodes are faulty, the data of some nodes is not normally receivable. This affects operation of an entire train, reduces redundancy effects drastically and fails to fulfill tenets of redundancy.

The present disclosure optimizes a software implementation policy on the basis of the existing network redundancy design architecture, defines the switching between the active network and the standby network based on a bus error detection mechanism, and also imposes corresponding requirements on the active master node and the slave node. Specifically, a network relationship list is created in an object dictionary of each node so that a comparison with a heartbeat packet of the corresponding node on the bus is performed to determine whether the node has broken down. When one or more slave nodes have broken down on the active network, services are switched to the standby network to receive the data of such nodes, and the data of other nodes is still received on the active network. The present disclosure further defines a set of communication recovery mechanism (which is described in the foregoing embodiments and omitted herein).

To better clarify an operating process of the CANopen-based train network data transmission system provided in this embodiment of the present disclosure, the following gives an example.

In this example, two master nodes are set up in a network (one is an active master node, and the other is a standby master node (not operational by default)), and five slave nodes A, B, C, D, and E. It is defined that the active master node receives data from the slave nodes A, B, and C, the slave node A receives data from the slave nodes B, C, and D, the slave node B receives data from the slave nodes A and E, and the slave node C receives data from the slave nodes B and D.

When the first CAN channel of the slave node B is faulty, according to the definition above, the nodes that need to receive data from the slave node B include the active master node, the slave node A, and the slave node C. The three nodes store an ID of the slave node B in their respective object dictionary. Because the first CAN channel of the slave node B is faulty, the active master node, the slave node A, and the slave node C will keep failing to receive the heartbeat packet of the slave node B on the active network.

Figure 18:
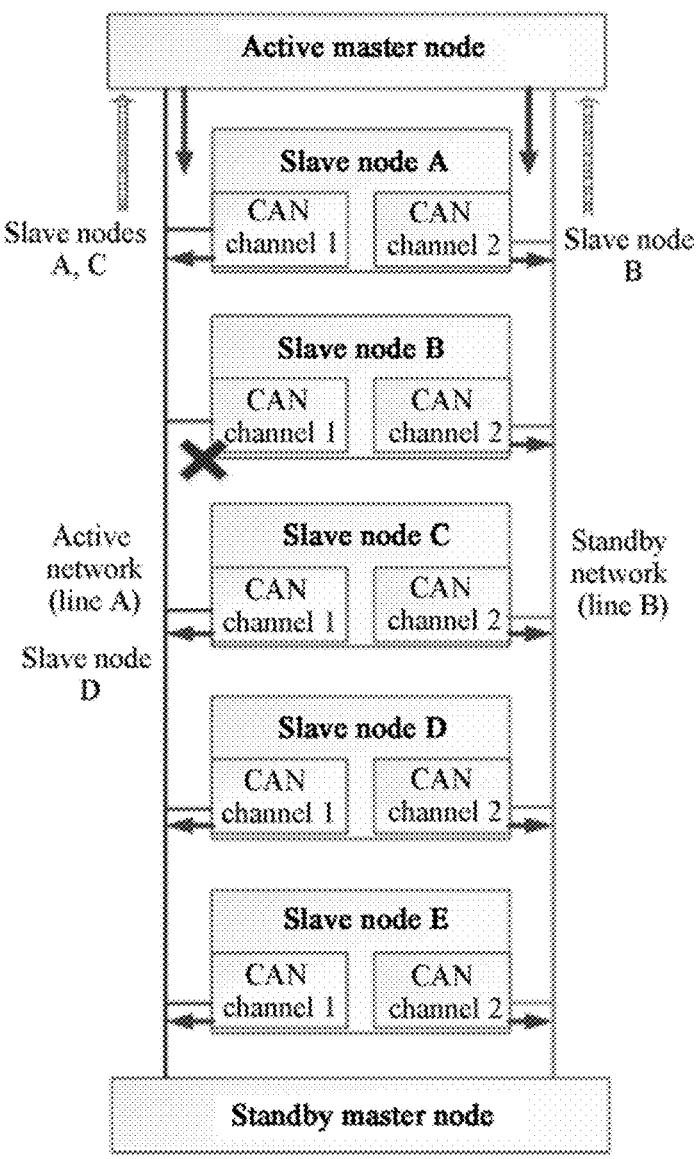
FIG. 18 is a schematic diagram of receiving data by an active master node when a first CAN channel of a node is faulty according to the present disclosure.
Figure 19:
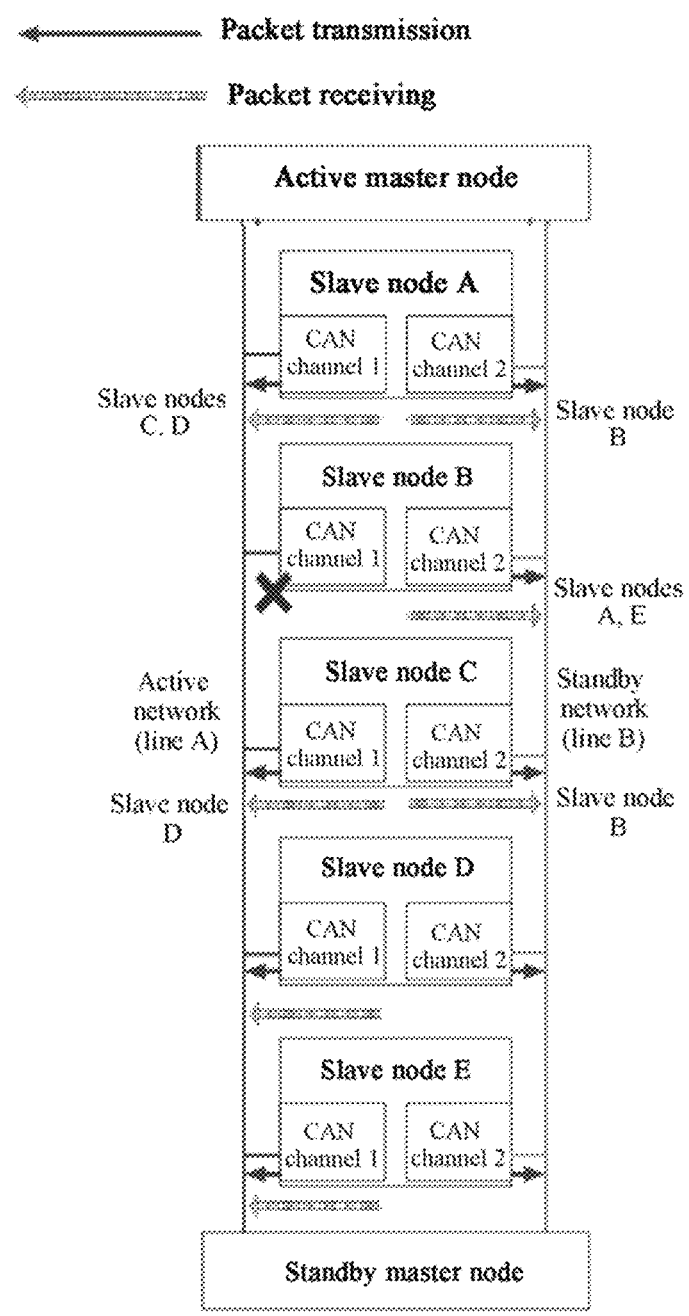
FIG. 19 is a schematic diagram of receiving data by a slave node when a first CAN channel of a node is faulty according to the present disclosure.

In this way, when no heartbeat packet of the slave node B is detected within three heartbeat periods, the active master node first transmits a network control reset instruction to reset the node, and then monitors the heartbeat packet in two heartbeat periods. If the slave node B is still faulty within the two heartbeat periods, all the active master node, the slave node A, and the slave node C switch to the second CAN channel to monitor on the standby network to check whether the heartbeat packet of the slave node B is received and whether the second CAN channel of the slave node B normally transmits data. In this way, data receipt status of the active master node is shown in FIG. 18. In FIG. 18, the master node A receives the data of the slave nodes A, B, and C. Specifically, the active master node receives the data of the slave nodes A and C from the active network and processes the data, and receives the data of the slave node B from the standby network and processes the data. Data receipt status of the slave node A and the slave node C is shown in FIG. 19. In FIG. 19, the slave node A receives data of the slave nodes B, C, and D, the slave node B receives data of the slave nodes A and E, and the slave node C receives data of the slave nodes B and D. Specifically, the slave node A receives and processes data of the slave nodes C and D from the active network, and receives and processes data of the slave node B from the standby network, and the slave node C receives and processes data of the slave node D from the active network, and receives and processes data of the slave node B from the standby network.

Thus, the CANopen-based train network data transmission system provided in this embodiment of the present disclosure resolves the problem in the prior art that the data of some nodes fails to be received normally when different channels of multiple nodes are faulty, effectively avoids discard of some node data when active networks of some nodes have a channel fault and standby networks of some other nodes have a channel fault, enhances practical effects of redundancy design, properly avoids disrupted operation of an entire train caused by a network fault of the train, and ensures that all nodes on a network can still communicate normally in some abnormal circumstances.

In description of the present disclosure, description of reference terms such as "one embodiment", "some embodiments", "example", "specific example" or "some examples" means including specific features, structures, materials, or features described in the embodiment or example in at least one embodiment or example of the present disclosure. In this specification, schematic descriptions of the foregoing terms are not necessarily directed at a same embodiment or example. In addition, the described specific features, structures, materials, or features can be combined in a proper manner in any one or more embodiments or examples. In addition, in a case that is not mutually contradictory, a person skilled in the art can combine or group different embodiments or examples that are described in this specification and features of the different embodiments or examples.

Although the embodiments of the present disclosure are shown and described above, it can be understood that, the foregoing embodiments are exemplary, and cannot be construed as a limitation to the present disclosure. Within the scope of the present disclosure, a person of ordinary skill in the art may make changes, modifications, replacement, and variations to the foregoing embodiments.

What is claimed is:

1. A CANopen-based train network data transmission method for an active master node, comprising:
    monitoring, based on a preset network node list and on an active network, a heartbeat packet transmitted through a first CAN channel by each slave node related to the active master node;
    determining, based on timing status of a heartbeat timer that is set corresponding to each slave node and based on receipt status of the heartbeat packet, whether the first CAN channel of each slave node is faulty;
    determining, if no heartbeat packet of a first node is received within a preset first heartbeat period, that a first CAN channel of the first node is faulty, and switching to a standby network to monitor the heartbeat packet transmitted by the first node, wherein the first node is any slave node related to the active master node; and
    receiving, if a heartbeat packet transmitted by the first node through a second CAN channel is received within the preset first heartbeat period, data on the standby network that is transmitted by the first node, and also receiving, on the active network, data transmitted by other slave nodes that is not faulty.

2. The method according to claim 1, wherein after it is determined that no heartbeat packet of the first node is received within the preset first heartbeat period, the method further comprises:
    transmitting a reset instruction to the first node from the active network;
    continuing to monitor, on the active network, the heartbeat packet transmitted by the first node, and detecting whether the heartbeat packet of the first node is received on the active network within a preset second heartbeat period; and
    proceeding to the step of determining, if no heartbeat packet of the first node is received on the active network within the preset second heartbeat period, that the first CAN channel of the first node is faulty.

3. The method according to claim 1, wherein after the receiving, if a heartbeat packet transmitted by the first node through a second CAN channel is received within the preset first heartbeat period, data on the standby network that is transmitted by the first node, and also receiving, on the active network, data transmitted by other slave nodes that normally transmit heartbeat packets, the method further comprises:
    transmitting a current fault message of the first CAN channel of the first node to an operation monitoring node, and displaying the current fault message as a prompt of a current fault to be fixed; and
    continuing to monitor, on the active network, the heartbeat packet transmitted by the first node through the first CAN channel, and determining, if the heartbeat packet of the first node is received within the preset first heartbeat period, that the first CAN channel of the first node has recovered communication, and switching to the active network to receive the data transmitted by the first node.

4. The method according to claim 3, wherein after the switching to the active network to receive the data transmitted by the first node, the method further comprises:
    transmitting a historical fault message of the first CAN channel of the first node to the operation monitoring node, and displaying the historical fault message as a prompt of a latent fault to be fixed.

5. The method according to claim 1, wherein after the switching to the standby network to monitor the heartbeat packet transmitted by the first node, the method further comprises:
    transmitting a reset instruction to the first node from the standby network if no heartbeat packet transmitted by the first node through the second CAN channel is received within the preset first heartbeat period;
    continuing to monitor, on the standby network, the heartbeat packet transmitted by the first node; and
    receiving, if a heartbeat packet transmitted by the first node through the second CAN channel is received within the preset second heartbeat period, data on the standby network that is transmitted by the first node, and also receiving, on the active network, data transmitted by other slave nodes that normally transmit heartbeat packets.

6. The method according to claim 5, further comprising:
    transmitting, if no heartbeat packet transmitted by the first node through the second CAN channel is received within the preset second heartbeat period, a current fault message of the first CAN channel and the second CAN channel of the first node to the operation monitoring node, and displaying the current fault message as a prompt of a current fault to be fixed.

7. The method according to claim 6, further comprising:
    continuing to monitor, on the active network and the standby network, the heartbeat packet transmitted by the first node, and determining, if the heartbeat packet of the first node is received from the active network within the preset first heartbeat period, that the first CAN channel of the first node has recovered communication, and switching to the active network to receive the data transmitted by the first node, transmitting a current fault message of the second CAN channel of the first node to the operation monitoring node, and displaying the current fault message as a prompt of a current fault to be fixed; and
    continuing to monitor, on the standby network, the heartbeat packet transmitted by the first node through the second CAN channel, and transmitting, if the heartbeat packet of the first node is received from the standby network within the preset first heartbeat period, a historical fault message of the first CAN channel and the second CAN channel of the first node to the operation monitoring node, and displaying the historical fault message as a prompt of a latent fault to be fixed.

8. The method according to claim 6, further comprising:
continuing to monitor, on the active network and the standby network, the heartbeat packet transmitted by the first node, and determining, if the heartbeat packet of the first node is received from the standby network within the preset first heartbeat period, that the second CAN channel of the first node has recovered communication, and receiving from the standby network the data transmitted by the first node, transmitting a current fault message of the first CAN channel of the first node to the operation monitoring node, and displaying the current fault message as a prompt of a current fault to be fixed; and
continuing to monitor, on the active network, the heartbeat packet transmitted by the first node through the first CAN channel, and if the heartbeat packet of the first node is received from the active network within the preset first heartbeat period, switching to the active network to receive the data transmitted by the first node, transmitting a historical fault message of the first CAN channel and the second CAN channel of the first node to the operation monitoring node, and displaying the historical fault message as a prompt of a latent fault to be fixed.

9. The method according to claim 1, wherein before the monitoring, on the active network and based on a preset network node list, a heartbeat packet transmitted through the first CAN channel by each slave node related to the active master node, the method further comprises:
creating, based on a network topology view, a network node list corresponding to the active master node, wherein the network node list comprises an identifier of each slave node related to the active master node and a corresponding heartbeat timer; and
transmitting a network control instruction simultaneously from the active network and the standby network to all slave nodes to control the first CAN channel and the second CAN channel of the slave nodes to get into a heartbeat packet operation mode, and starting a heartbeat timer corresponding to each slave node related to the active master node.

10. The method according to claim 1, further comprising:
switching to a standby master node to perform data exchange with another related slave node if a fault of the active master node is detected.

11. A CANopen-based train network data transmission method for a slave node, comprising:
monitoring, based on a preset network node list and on an active network, a heartbeat packet transmitted through a first CAN channel by each node related to the slave node;
determining, based on timing status of a heartbeat timer that is set corresponding to each slave node and based on receipt status of the heartbeat packet, whether a first CAN channel of each slave node is faulty;
determining, if it is determined that no heartbeat packet of a second node is received within a preset first heartbeat period, that a first CAN channel of the second node is faulty, and switching to a standby network to monitor the heartbeat packet transmitted by the second node, wherein the second node is any slave node related to the slave node or is an active master node; and
receiving, if a heartbeat packet transmitted by the second node through a second CAN channel is received within the preset heartbeat period, data on the standby network that is transmitted by the second node, and also receiving, on the active network, data transmitted by other nodes that normally transmit heartbeat packets.

12. The method according to claim 11, wherein after a heartbeat packet transmitted by the second node through a second CAN channel is received within the preset heartbeat period, the method further comprises:
recording a current fault message of the first CAN channel of the second node; and
continuing to monitor, on the active network, the heartbeat packet transmitted by the second node through the first CAN channel, and determining, if the heartbeat packet of the second node is received within the preset heartbeat period, that the first CAN channel of the second node has recovered communication, and switching to the active network to receive the data transmitted by the second node.

13. The method according to claim 11, wherein after the switching to the standby network to monitor the heartbeat packet transmitted by the second node through the second CAN channel, the method further comprises:
recording, if no heartbeat packet transmitted by the second node through the second CAN channel is received within the preset heartbeat period, a current fault message of the first CAN channel and the second CAN channel of the second node.

14. The method according to claim 13, further comprising:
continuing to monitor, on the active network and the standby network, the heartbeat packet of the second node, and determining, if the heartbeat packet of the second node is received from the active network within the preset heartbeat period, that the first CAN channel of the second node has recovered communication, and switching to the active network to receive the data transmitted by the second node.

15. The method according to claim 13, further comprising:
continuing to monitor, on the active network and the standby network, the heartbeat packet transmitted by the second node, and determining, if the heartbeat packet of a first slave node is received from the standby network within the preset heartbeat period, that the second CAN channel of the second node has recovered communication, and receiving from the standby network the data transmitted by the second node; and
continuing to monitor, on the active network, the heartbeat packet transmitted by the second node through the first CAN channel, and switching, if the heartbeat packet of the second node is received from the active network within the preset heartbeat period, to the active network to receive the data transmitted by the second node.

16. The method according to claim 11, wherein before the monitoring, on the active network and based on a preset network node list, a heartbeat packet transmitted through the first CAN channel by each slave node related to the slave node, the method further comprises:
creating, based on a network topology view, a network node list corresponding to the slave node, wherein the network node list comprises an identifier of each slave node related to the slave node and a corresponding heartbeat timer; and
receiving from the active network a network control instruction transmitted by the active master node to trigger the first CAN channel and the second CAN channel to get into a heartbeat packet operation mode, and starting a heartbeat timer corresponding to each slave node related to the slave node.

17. An active master node, comprising:
a first monitoring module, configured to monitor, on an active network and based on a preset network node list, a heartbeat packet transmitted through a first CAN channel by each slave node related to the active master node;
a first determining module, configured to determine, based on timing status of a heartbeat timer that is set corresponding to each slave node and based on receipt status of the heartbeat packet, whether a first CAN channel of each slave node is faulty;
a first processing module, configured to learn, if it is determined that no heartbeat packet of a first node is received within a preset first heartbeat period, that a first CAN channel of the first node is faulty, and control the first monitoring module to switch to a standby network to monitor the heartbeat packet transmitted by the first node, wherein the first node is any slave node related to the active master node; and
a first receiving module, configured to receive, when a heartbeat packet transmitted by the first node through a second CAN channel is received within the preset first heartbeat period, data on the standby network that is transmitted by the first node, and also receive, on the active network, data transmitted by other slave nodes that normally transmit heartbeat packets.

18. The active master node according to claim 17, further comprising:
a first transmission module, configured to transmit a reset instruction to the first node from the active network when it is determined that no heartbeat packet of the first node is received within the preset first heartbeat period, wherein
the first processing module is further configured to continue to monitor, on the active network, the heartbeat packet transmitted by the first node, and detect whether the heartbeat packet of the first node is received on the active network within a preset second heartbeat period corresponding to the first node; and
the determining, by the first processing module, that a first CAN channel of the first node is faulty comprises:
determining, if no heartbeat packet of the first node is received on the active network within the preset second heartbeat period corresponding to the first node, that the first CAN channel of the first node is faulty.

19. The active master node according to claim 17, further comprising:
a first prompting module, configured to transmit, after a heartbeat packet transmitted by the first node through the second CAN channel is received, a current fault message of the first CAN channel of the first node to an operation monitoring node as a prompt of a current fault to be fixed, wherein
the first monitoring module is further configured to continue to monitor, on the active network, the heartbeat packet transmitted by the first node through the first CAN channel; and
the first processing module is further configured to learn, when the heartbeat packet of the first node is received within the preset first heartbeat period, that the first CAN channel of the first node has recovered communication, and control the first receiving module to switch to the active network to receive the data transmitted by the first node.

20. The active master node according to claim 19, wherein
the first prompting module is further configured to transmit a historical fault message of the first CAN channel of the first node to the operation monitoring node, and display the historical fault message as a prompt of a latent fault to be fixed.

* * * * *